United States Patent [19]

Horstein et al.

[11] Patent Number: 5,551,624
[45] Date of Patent: * Sep. 3, 1996

[54] MEDIUM-EARTH-ALTITUDE SATELLITE-BASED CELLULAR TELECOMMUNICATIONS

[75] Inventors: Michael Horstein, Los Angeles; Peter H. Cress, Manhattan Beach; Roger J. Rusch, Palso Verdes Estates, all of Calif.

[73] Assignee: TRW Inc., Redondo Beach, Calif.

[ * ] Notice: The term of this patent shall not extend beyond the expiration date of Pat. No. 5,433,726.

[21] Appl. No.: 440,311

[22] Filed: May 12, 1995

Related U.S. Application Data

[63] Continuation of Ser. No. 134,030, Oct. 12, 1993, Pat. No. 5,439,190, which is a continuation-in-part of Ser. No. 890,510, May 28, 1992, Pat. No. 5,433,726, which is a continuation-in-part of Ser. No. 688,412, Apr. 22, 1991, abandoned.

[51] Int. Cl.⁶ ..................................................... B64G 1/10
[52] U.S. Cl. ..................... 244/158 R; 342/356; 343/756; 359/867; 455/12.1
[58] Field of Search ...................... 244/158 R; 343/754; 359/867; 375/1; 379/59, 60; 455/11.1, 12.1, 13.1, 13.2, 13.3; 344/352–358, 359, 360

[56] References Cited

U.S. PATENT DOCUMENTS

| | | | |
|---|---|---|---|
| 3,243,706 | 3/1966 | Grishem | 325/15 |
| 3,331,071 | 7/1967 | Webb | 343/100 |
| 3,340,531 | 9/1967 | Kefalas et al. | 343/100 |
| 3,349,398 | 10/1967 | Werth | 343/100 |
| 3,384,891 | 5/1968 | Anderson | 343/6.5 |
| 3,497,807 | 2/1970 | Newton | 325/4 |
| 3,678,387 | 7/1972 | Wilson | 325/4 |
| 3,710,027 | 1/1973 | Herter et al. | 179/15 BS |
| 3,928,804 | 12/1975 | Schmidt et al. | 325/4 |

(List continued on next page.)

FOREIGN PATENT DOCUMENTS

| | | |
|---|---|---|
| 0365885 | 10/1988 | European Pat. Off. . |
| 331567 | 9/1989 | European Pat. Off. . |
| 0510789 | 4/1991 | European Pat. Off. . |
| 484662 | 5/1992 | European Pat. Off. . |
| 510789 | 10/1992 | European Pat. Off. . |
| 575678 | 12/1993 | European Pat. Off. . |
| 0331567 | 3/1988 | France . |
| 0059454 | 2/1981 | Germany . |
| 0237009 | 3/1986 | Germany . |

OTHER PUBLICATIONS

Adams, W. S. et al., "Circular Polar Constellations Providing Continuous Single or Multiple Coverage Above a Specified Latitude", *The Journal of the Astronautical Sciences*, vol. 35, No. 2, pp. 155–192 (1987).

American Astronautical Society Publication, "Advances in the Astronautical Sciences," vol. 9 (1961).

(List continued on next page.)

*Primary Examiner*—Galen Barefoot
*Attorney, Agent, or Firm*—Michael S. Yatsko

[57] ABSTRACT

A satellite-based cellular telecommunications system employing a constellation of telecommunications satellites in medium earth orbit to provide multibeam radio frequency (rf) communications links for worldwide cellular telephone service with a minimum number of satellites. The telecommunications satellites are placed in a plurality of inclined orbits about the earth at an altitude of between approximately 5600 and 10,000 nautical miles. The characteristics of the orbits, such as the number of orbits, the inclination of each orbit, the number of satellites in each orbit and the altitude of the satellites, are tailored to maximize the coverage area of the satellites and their related line-of-sight elevation angles, while minimizing propagation time delays, the number of beam-to-beam and satellite-to-satellites handovers, and the total number of satellites. The present invention also includes several additional features which essentially eliminate beam-to-beam and satellite-to-satellite handovers, thus dramatically reducing the likelihood of dropouts.

33 Claims, 23 Drawing Sheets

U.S. PATENT DOCUMENTS

| | | | |
|---|---|---|---|
| 4,018,993 | 4/1977 | Edstrom | 179/15 |
| 4,109,202 | 8/1978 | Kudsia et al. | 325/3 |
| 4,144,495 | 3/1979 | Metzger | 325/4 |
| 4,189,675 | 8/1979 | Acampora et al. | 325/4 |
| 4,201,992 | 5/1980 | Welti | 343/840 |
| 4,220,821 | 9/1980 | Lucas | 370/110 |
| 4,232,321 | 11/1980 | Ohm | 343/778 |
| 4,398,291 | 8/1981 | Hotta et al. | 370/104 |
| 4,418,350 | 11/1983 | Rosen | 343/359 |
| 4,425,639 | 1/1984 | Acampora et al. | 370/50 |
| 4,455,651 | 6/1984 | Baran | 370/104 |
| 4,458,249 | 7/1984 | Valentino et al. | 343/754 |
| 4,581,736 | 4/1986 | Dobyns et al. | 370/92 |
| 4,599,619 | 7/1986 | Keigler et al. | 343/352 |
| 4,616,108 | 10/1986 | Yamaguchi et al. | 179/2 E |
| 4,628,506 | 12/1986 | Sperlich | 370/104 |
| 4,630,058 | 12/1986 | Brown | 342/359 |
| 4,672,655 | 6/1987 | Koch | 379/57 |
| 4,672,656 | 6/1987 | Pfeiffer et al. | 379/158 |
| 4,690,354 | 9/1987 | Frisch | 244/158 R |
| 4,691,882 | 9/1987 | Young | 244/158 R |
| 4,792,813 | 12/1988 | Rosen | 343/781 |
| 4,809,006 | 2/1989 | Dar | 342/352 |
| 4,809,935 | 3/1989 | Draim | 244/158 R |
| 4,813,036 | 3/1989 | Whitehead | 370/57 |
| 4,819,227 | 4/1989 | Rosen | 370/75 |
| 4,827,421 | 5/1989 | Dondl | 364/459 |
| 4,854,527 | 8/1989 | Draim | 244/158 R |
| 4,868,886 | 9/1989 | Assel et al. | 455/12 |
| 4,872,015 | 10/1989 | Rosen | 342/353 |
| 4,897,642 | 1/1990 | DiLullo et al. | 340/825.060 |
| 4,931,802 | 6/1990 | Assal et al. | 342/356 |
| 4,943,808 | 7/1990 | Duick et al. | 342/356 |
| 4,985,706 | 1/1991 | Schukat | 342/352 |
| 5,006,855 | 4/1991 | Braff | 342/357 |
| 5,010,317 | 4/1991 | Schwendeman et al. | 340/311.1 |
| 5,017,925 | 5/1991 | Bertiger et al. | 342/352 |
| 5,023,900 | 6/1991 | Tayloe et al. | 379/32 |
| 5,025,485 | 6/1991 | Csongor et al. | 455/12 |
| 5,038,398 | 8/1991 | Wills | 455/13 |
| 5,053,782 | 10/1991 | Levinberg et al. | 342/352 |
| 5,073,900 | 12/1991 | Mallinckrodt | 375/1 |
| 5,119,225 | 6/1992 | Grant et al. | 359/172 |
| 5,121,409 | 6/1992 | Goss | 375/1 |
| 5,121,503 | 6/1992 | Davis | 455/12.1 |
| 5,161,248 | 11/1992 | Bertiger et al. | 455/17 |
| 5,184,139 | 2/1993 | Hirako et al. | 342/354 |
| 5,258,867 | 11/1993 | Iggulden et al. | 359/867 |
| 5,339,330 | 8/1994 | Mallinckrodt | 375/1 |
| 5,408,237 | 4/1995 | Patterson et al. | 455/12.1 |
| 5,410,728 | 4/1995 | Beriger | 455/13.1 |

OTHER PUBLICATIONS

Ballard, A. H., "Rosette Constellations of Earth Satellites," IEEE, vol. AES–16, No. 5, pp. 656–673 (1980).

Benedicto, J. et al., "MAGSS–14 A Medium–Altitude Global Mobile Satellite System for Personal Communications at L–band," ESTEC (1992).

Beste, D. C., "Design of Satellite Constellations for Optimal Continuous Coverage," IEEE *Transactions on Aerospace and Electronic Systems*, AES–14, No. 3, pp. 466–473 (1978).

Clare, L. P. et al., "Multiple Satellite Networks: Performance Evaluation Via Simulation," *Milcom*, vol. 2, No. 20, pp. 404–411 (1987).

Cline, J. K. et al., "Quasicircular Ground Tracks for Geosynchronous Earth Satellites," O. *J. Spacecraft*, vol. 23, No. 2, pp. 144–148 (1986).

Dondl, Peter, "Digital Network Oriented Mobile Radio Satellite System as an Integrated Part of the GSM Radio System in Europe".

Draim, J. E. et al., "Satellite Constellations for Optimal Northern Hemisphere Coverage," Presentation at Ninth DARPA Strategic Space Symposium (1983).

Draim, J. E., "Three–and Four–Satellite Continuous–Coverage Constellations," AIAA, AIAA/AAS Astrodynamics Conference (1984).

Draim, J. E., "Three–and Four Satellite Continuous–Coverage Constellations," *J. Guidance*, vol. 8, No. 6, pp. 725–730 (1985).

Draim, J. E., "A Common Period Four–Satellite Continuous Global Coverage Constellation," AIAA, pp. 1–9 (1986).

Kachmar, Michael, "Land–mobile satellites pick up," Microwaves & RF, pp. 33–35, Aug. 1984.

Mozhaev, G. V., "The Problem of Continuous Earth Coverage and Kinematically Regular Satellite Networks, II," pp. 52–61 (1973).

Neyret, P. et al., "The Intelsat VII Spacecraft," AIAA 13th Communications, Satellite System Conference, Los Angeles, Calif., pp. 1–16, Mar, 1990.

Rafferty, W. et al., "RF Development for Mobile–Satellite Systems," MSN & CT, pp. 28–30, 37 (1988).

Schmidt, F. et al., "Electronically Steered Phased Array Antenna for MSAT," MSN & CT, pp. 41–43 (1988).

Space Handbook, "Satellite Ground Tracks," Air University, pp. 2–38 to 2–46.

Wadsworth, D., "Longitude–reuse Plan Doubles Communication Satellite Capacity of Geostationary Arc," AIAA 8th Communications Satellite Systems conference, pp. 198–204 (1980).

Walker, J. G., "Some Circular Orbit Patterns for Whole Earth Coverage," Technical Memo 149, Royal Aircraft Establishment (1970).

Walker, J. G., "Continuous Whole–Earth Coverage by Circular–Orbit Satellite Patterns," Technical Report 77044, Defense Technical Information Center (1977).

Walker, J. S., "Satellite Patterns for Continuous Multiple Whole–Earth Coverage," Royal Aircraft Establishment, pp. 119–122 (1977).

Walker, J. G., "Coverage Predictions and Selection Criteria for Satellite Constellations,"Technical Report 82116, Royal Aircraft Establishment (1982).

Lang, Thomas J. et al. "Orbital Constellations Which Minimize Revisit Time," AAS 83–402, pp. 1070–1086 (1983).

Lang, Thomas J., "Symmetric Circular Orbit Satellite Constellations For Continuous Global Coverage," AAS 87–699, pp. 1111–1132 (1987).

Luck, D. G. C., "System Organization for General Communication Via Medium Altitude Satellites," RCA Review, pp. 293–324 (1963).

Nauck et al., "The Loopus Concept and its Positions," Z. Flugwiss Umfurech Dec. 1988, pp. 191–196.

"Application of TRW Inc. to the Federal Communications Commission for Authority to Construct a New Communications Satellite System, (Odyssey)", (1991).

"A Medium Altitude Random Orbit Communications Satellite System", Conference Proceedings of Sixth Winter Convention on Military Electronics, Los Angeles, Feb. 3–5, 1965, pp. 11C–1 by Eugene F. O'Neill for Bell Telephone Laboratories.

"Spin Stabilized, Synchronous Orbit Satellites", Conference Proceedings of Sixth Winter Convention on Military Electronics, Los Angeles, Feb. 3–5, 1965, pp. IIC–27 to IIC–40 by Dr. Harold A. Rosen for Hughes Aircraft Company.

"Economic Factors Affecting the Introduction of Worldwide Communication Satellite Service", Conference Proceedings of Sixth Winter Convention on Military Electronics, Los Angeles, Feb. 3–5, 1965, pp. IIC–27 to IIC–40, by Siegfried H. Reiger for COMSAT.

"Future Trends in Satellite Communication", Conference Proceedings of Sixth Winter Convention on Military Electronics, Los Angeles, Feb. 3–5, 1965, pp. IIC–40, by W. E. Morrow, Jr. for Lincoln Laboratory, Massachusetts Institutes of Technology.

"Taking a Flyer in Outer Space", Newsweek, pp. 85–90, Mar. 16, 1964.

"Live via Satellite", Acropolis Book Ltd., Washington D.C., introduction by Arthur C. Clarke, pp. 19–36, 1989, by A. M. Tedeschi.

"The Beginnings of Satellite Communications"–J. R. Pierce, p. 29, 30, 1968.

"Commercial Satellite Communication"–R. E. O. Beck et al, Proc. IEEE Rev., vol. 119, No. 8R, Aug. 1972.

"Voice Across The Sea", Harper & Row, Publishers, Inc., N.Y., N.Y., by Arthur C. Clarke, pp. 196–205, 1974.

"Die grenzenlose Dimension–Raumfahrt"–Harry O. Ruppe, pp. 279–291, 1980.

"Satellite Transmission Systems", BASS II Publications, Lewes, DE, by James B. Potts, pp. 17–30, 1993.

"Communications Satellites: The Experimental Years"–B. I. Edelson, Acta Astronautica vol. 11, No. 7–8, pp. 407–413, 1984.

"Satellite Navigation", Reprint, pp. 113–121, Sep. 1, 1978, Kaiundo Publishers K. K. by Shoichi Kimura, (In Japanese).

"Newly–Revised Edition GSP–Precision Location Survey System by Artificial Satellite", pp. 193–195, Nov. 15, 1989, Nihon Survey Association by Nihon Geodesy Society, (In Japanese).

"Satellite Communication Engineering", pp. 25–29, Jun. 30, 1969, K. K. Rateisu by Kenichi Miya, (In Japanese).

"Communications Satellite System", pp. 41–60, 1978 by James Martin.

"Satellite Communication System", Post Office Elect. Eng. J., 55 Part 2 (Jul. 1962), pp. 97–104 by Bray.

"Satellite Communication", Fifth Edition, pp. 8–9, Jun. 25, 1981, K. K. Corona by Takeshi Kawasaki, (In Japanese).

"Amateur Satellite Communication", Second Edition, pp. 69–72, Feb. 28, 1975, CQ Publisher K, by Nihon AMSAT, (In Japanese).

"CQ ham radio", vol. 43, No. 11, pp. 214–221, Nov. 1, 1988, CQ Publisher K. K. (In Japanese).

"International Forum on Mobile Satellite Communications, Conv. Trans.", pp. 178–181, May 10, 1989, International Satellite Communication Association, (In Japanese).

"Continuous Whole Earth Coverage By Circular Orbit Satellites", IEEE Conference Publication 95, Satellite Systems for Mobile Communications and Serveillance, pp. 35–38 (1973), J. G. Walker.

"Land Mobile Communications Satellite System Design", AIAA–84–0753, pp. 467–475 (1984), TRW Space and Technology Group, M. Horstein.

"Medium Altitude Phased Orbit Satellite Systems", TRW Space Technologies Laboratories, Proceedings Electronics in Transition, vol. 4, 6th Winter Convention on Military Electronics, Los Angeles Feb 3–5 1965, pp. IIC–17 to IIC–24., A. K. Thiel.

P. 93 of Motorola's FFC application (FCC4).

"Odyssey, A Constellation for Personal Communications"AIAA–92–2060, March 1992, Rusch et al.

"LEO Satellite–Based Telecommunication Network Concepts" Proceedings Workshop on Advanced Network and Technology Concepts for Mobile, Micro, and Personal Communication, May 30–31, 1991, J. G. Aiken, et al.

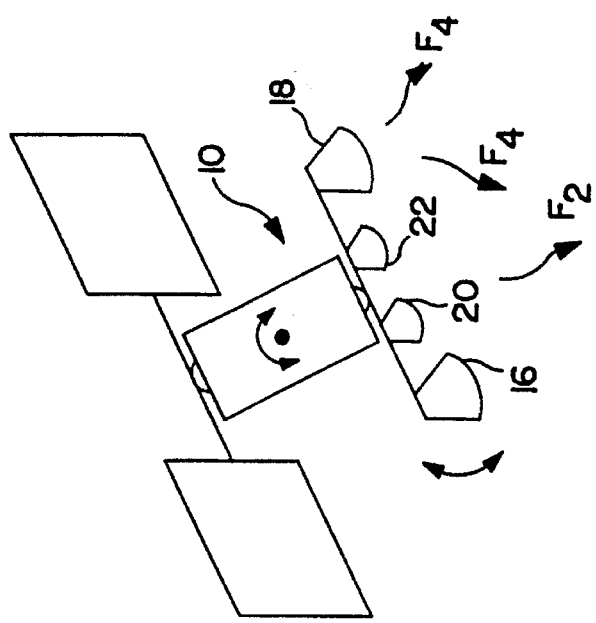
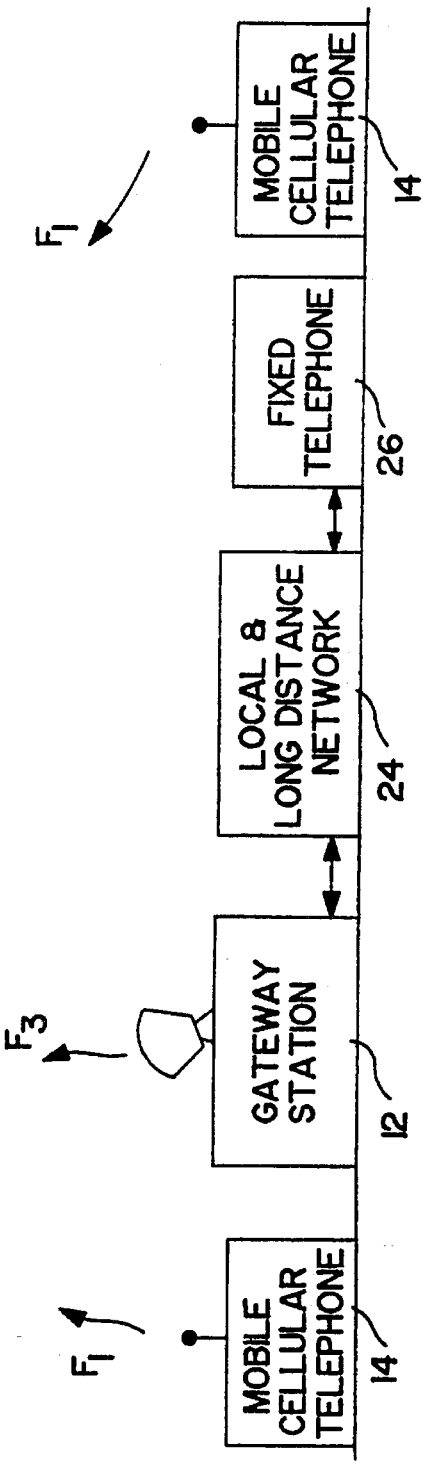

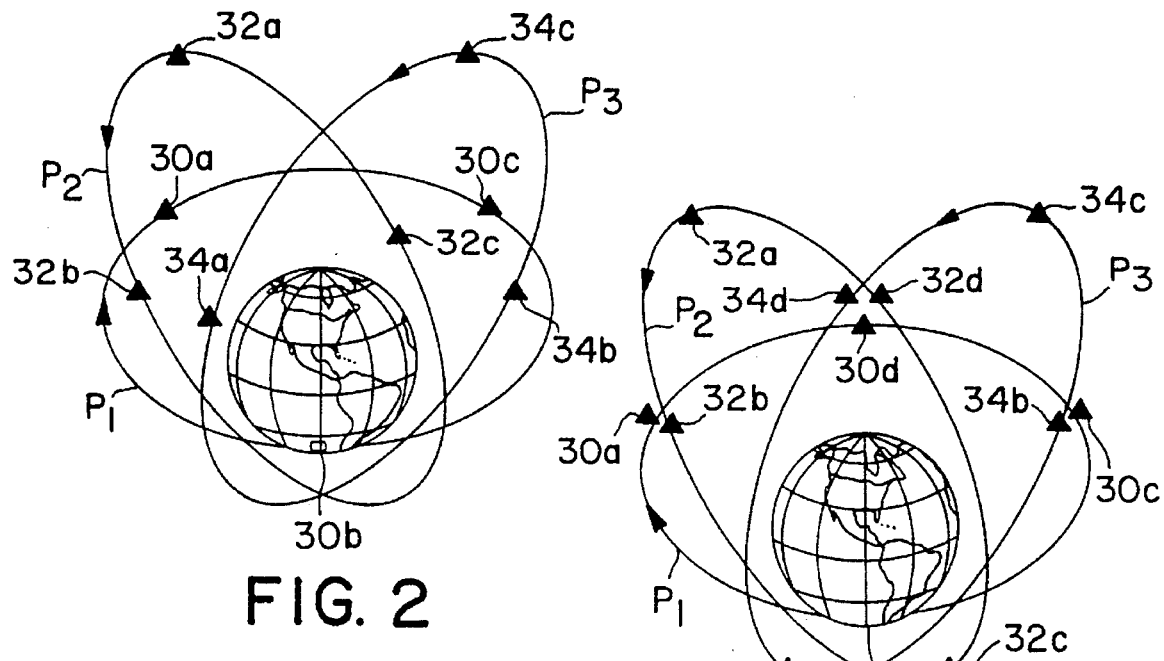
FIG. 2
FIG. 3
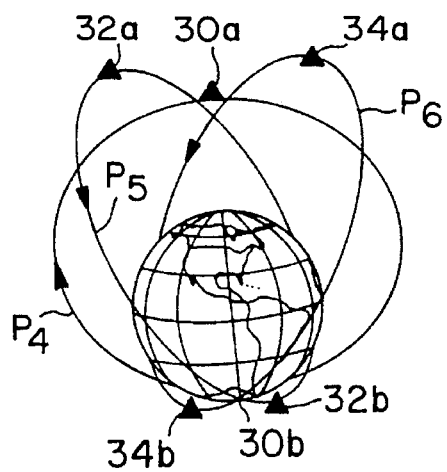
FIG. 4
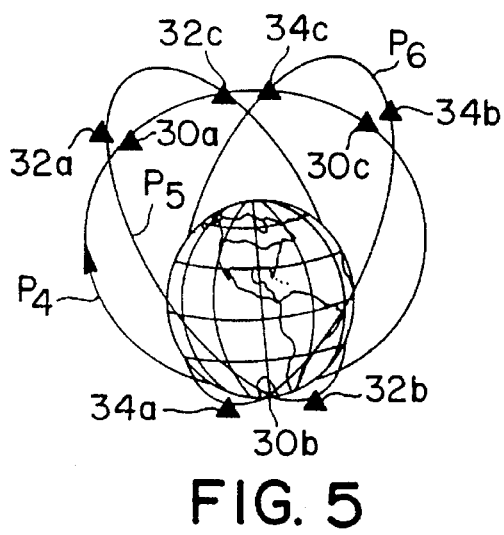
FIG. 5

5,551,624

MEDIUM-EARTH-ALTITUDE SATELLITE-BASED CELLULAR TELECOMMUNICATIONS

CROSS-REFERENCE TO RELATED APPLICATIONS

This is a continuation of U.S. patent application Ser. No. 08/134,030, filed Oct. 12, 1993, issuing as U.S. Pat. No. 5,439,190, on Aug. 8, 1995, which is a Continuation-in-Part of Ser. No. 07/890,510, filed May 28, 1992, issuing as U.S. Pat. No. 5,433,726, on Jul. 18, 1995, which is a Continuation-in-Part of application Ser. No. 07/688,412, filed Apr. 22, 1991, now abandoned.

BACKGROUND OF THE INVENTION

This invention related generally to cellular telecommunications systems and, more particularly, to satellite-based cellular telecommunications systems and methods attendant thereto.

The use of mobile cellular telephones has proliferated in the many large metropolitan areas in which cellular telecommunications systems have been installed. Cellular telecommunications systems provide voice communications between a mobile telephone user and fixed telephone users or to other mobile telephone users, as well as data communications for mobile facsimile machines and modem-equipped computers. A typical cellular telephone systems includes a grid of service zones or cells, with each cell having a base station situated near its center. A mobile telephone user located in a particular cell is connected to that cell's base station through low-power radio frequency (rf) transmissions. Each base station is connected by trunk lines to a gateway station, which is connected by trunk lines to a local and long distance telephone network.

The cellular telecommunications systems in use today are generally land-based systems that have been installed in large metropolitan areas. Small towns and rural areas cannot economically justify the installation and operation of one of these relatively costly systems. To provide cellular telephone service for these areas, satellite-based cellular telecommunications systems have been proposed which would provide world-wide cellular telephone service. These proposed cellular telephone systems typically include a large constellation of telecommunications satellites in low earth orbit at an altitude of between approximately 400 and 1000 nautical miles, which is just below the Van Allen radiation belt. At these low altitudes, as many as 50 to 80 satellites are required to provide adequate coverage of the entire earth. This results in an extremely costly and complex system with a large number of rapidly changing crosslinks and a large number of beam-to-beam and satellite-to-satellite handovers. Accordingly, there has been a need for a less costly and complex satellite-based cellular telecommunications system. The present invention clearly fulfills this need.

SUMMARY OF THE INVENTION

The present invention resides in a satellite-based cellular telecommunications system employing a constellation of telecommunications satellites in medium altitude earth orbit to provide multibeam radio frequency (rf) communications links for world-wide land mass cellular telephone service with a minimum number of satellites. The telecommunications satellites are placed in a plurality of inclined orbits about the earth at an altitude of between approximately 5600 and 10,000 nautical miles. The characteristics of the orbit, such as the number of orbits, the inclination of each orbit, the number of satellites in each orbit and the altitude of the satellites, are tailored to maximize the coverage area of the satellites and their related line-of-sight elevation angles, while minimizing propagation time delays, the number of beam-to-beam and satellite-to-satellite handovers, and the total number of satellites.

The present invention also includes several additional features which essentially eliminate beam-to-beam and satellite-to-satellite handovers, thus dramatically reducing the likelihood of dropouts. One of these important features is an assignment of each satellite to a sequence of fixed service regions (rather than a continuously varying coverage area) during each satellite's orbit. The boresight of the satellite's antennas remains centered on a given assigned service region during the entire time the service region is visible to the satellite. This results in an essentially fixed beam pattern thus practically eliminating beam-to-beam handovers. Another one of these important features is a provision for overlap in the coverage of each service region by two successive satellites during the transition in service from one satellite to another. All calls that are placed during the overlap interval are assigned to the arriving satellite. Therefore, only calls placed prior to the overlap interval and extending beyond the overlap interval are subjected to satellite-to-satellite handovers when a departing satellite is reoriented to its new service region.

In one preferred embodiment of the present invention, a constellation of nine satellites provides complete global coverage of the earth by at least one satellite at all times with a minimum elevation angle of 10°. The constellation includes three inclined circular orbital planes which are evenly spaced about the earth with ascending nodes at 120° intervals about the equator. Three satellites are placed in each orbit and evenly spaced at 120° intervals at an altitude of 5600 nautical miles. Each orbital plane is inclined at an angle of 53° relative to the equatorial plane. In another preferred embodiment of the invention, a constellation of twelve satellites provides global coverage of the earth by at least two satellites at all times with a minimum elevation angle of 10°. The constellation includes three inclined circular orbital planes with the same characteristics as the nine satellite constellation, except that four satellites are placed in each orbit, evenly spaced at 90° intervals. Two additional embodiments are disclosed which use elliptical orbits to provide hemispheric coverage of the earth by at least one and two satellites, respectively, at all times with a minimum elevation angle of 10°.

The present invention also provides an original satellite-based cellular telecommunications system which, is also capable of evolving in phases to a full baseline satellite-based cellular telecommunications system as the traffic demand and revenue stream increase in magnitude. The original system utilizes a minimum number of satellites which can nevertheless serve a substantial portion of the potential subscriber population. Accordingly, the original system of the present invention will reduce the initial capital investment required, while still enabling commercially significant satellite coverage to be achieved in a way which will not adversely affect the anticipated growth toward a full baseline satellite-based cellular telecommunications system. However, it should be appreciated that the original system also provides a complete satellite-based cellular telecommunications system in terms of its coverage regions.

In one embodiment of the original system according to the present invention, a six-satellite medium orbit constellation is employed with two satellites in each of three orbital planes. The use of three orbital planes also facilitates the capability to launch the satellites in pairs, which will minimize launch costs and reduce the sequence of launches requires before the original system is operational. However, the original system may also employ a six-satellite medium orbit constellation with each of the satellites residing in their own individual orbital planes. In any event, continuous satellite coverage is provided in a restricted, but economically significant, range of latitudes. Satellite coverage outside of this latitude range has several, typically small gaps during the course of a day, which would result in a small reduction of the time that satellite coverage would be available.

In addition to the reduced number of satellites in the original system according to the present invention, an enlarged field-of-view (FOV) is provided for each of the satellites in comparison with the FOV for the satellites in the earlier embodiments. The enlarged FOV is needed due to the fact that fewer satellites will be employed in the original system than will be employed in the full baseline satellite-based telecommunications system. While this has the effect of increasing the coverage area responsibility of each satellite, there will also be a slight reduction in the communication margins in the user-to-satellite direction. Nevertheless, the enlarged FOV (e.g., 38° to 40°) will still be substantially less the total satellite visibility (e.g., 44°). In order to compensate for this difference in FOV, the original system also employs the directed coverage method according to the present invention. This method of controlling a constellation of satellites utilizes the ability to programmably steer the boresight of the satellite communication antennas to the desired regions of interest.

It will be appreciated from the foregoing that the present invention represents a significant advance in the field of satellite-based cellular telecommunications systems. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 1 is a schematic illustration of a satellite-based cellular telecommunications system in accordance with the present invention;

FIG. 2 is a schematic illustration of a constellation of telecommunication satellites providing single global land mass coverage of the earth;

FIG. 3 is a schematic illustration of a constellation of telecommunication satellites providing double global land mass coverage of the earth;

FIG. 4 is a schematic illustration of a constellation of telecommunication satellites providing single hemispheric coverage of the earth;

FIG. 5 is a schematic illustration of a constellation of telecommunication satellites providing double hemispheric coverage of the earth;

DETAILED DESCRIPTION OF THE PREFERRED EMBODIMENTS

Figure 6:
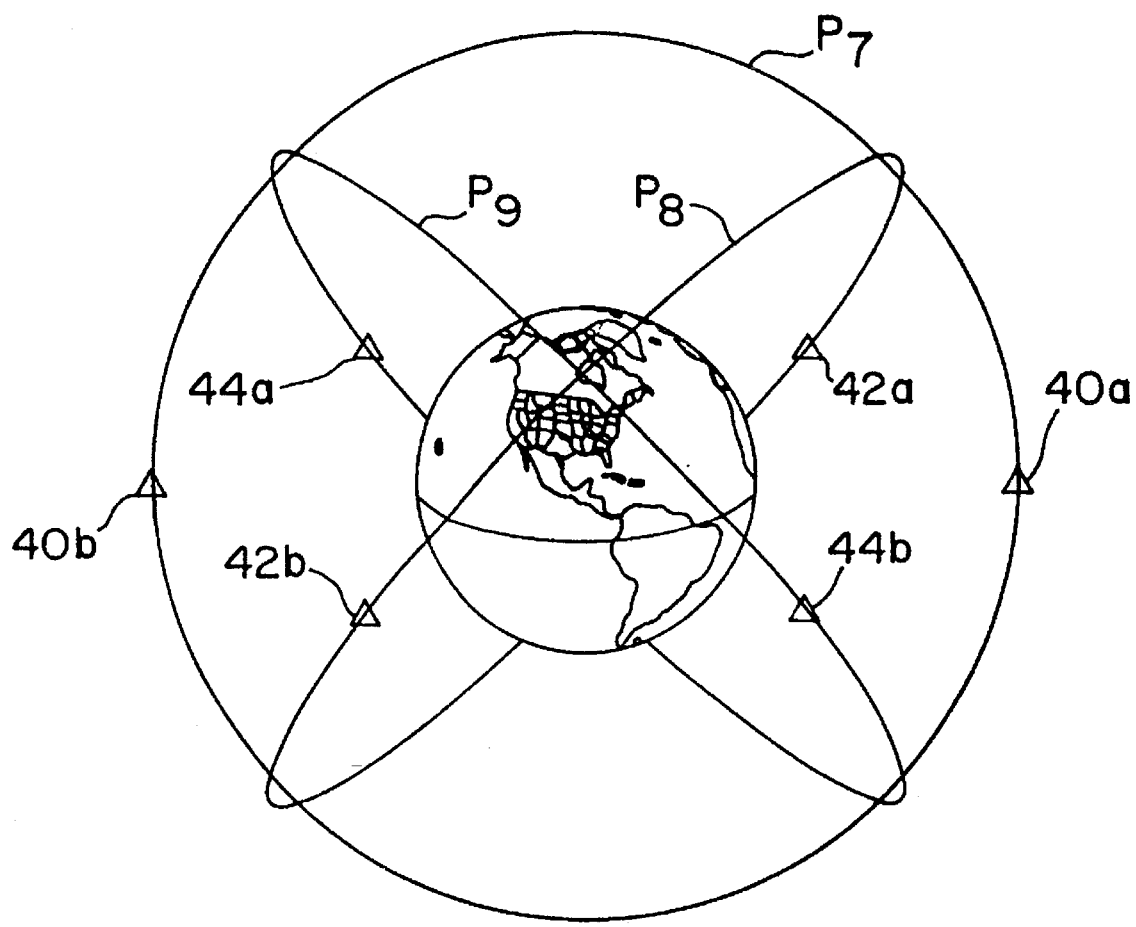
FIG. 6 is a schematic illustration of a original constellation of telecommunication satellites which provides partial coverage of the earth.

As shown in the drawings for purposes of illustration, the present invention is embodied in a satellite-based cellular telecommunications system employing a constellation of telecommunications satellites in medium earth orbit to provide multibeam radio frequency (rf) communications links for world-wide land mass cellular telephone service with a minimum number of satellites. The telecommunications satellites are placed in a plurality of inclined orbits about the earth at an altitude of between approximately 5600 and 10,000 nautical miles. The characteristics of the orbits, such as the number of orbits, the inclination of each orbit, the number of satellites in each orbit and the altitude of the satellites, are tailored to maximize the coverage area of the satellites and their related line-of-sight elevation angles, while minimizing propagation time delays, the number of beam-to-beam and satellite-to-satellite handovers, and the total number of satellites. The present invention also includes several additional features which essentially eliminate beam-to-beam and satellite-to-satellite handovers, thus dramatically reducing the likelihood of dropouts.

FIG. 1 illustrates a satellite-based cellular telecommunications system in accordance with the present invention. The cellular telecommunications system includes a constellation of telecommunications satellites 10 in medium earth orbit, a gateway station 12 situated in each region serviced by the satellites and a plurality of mobile cellular telephones 14 located in the service region of the satellite 10. The mobile cellular telephones 14 can also include mobile facsimile machines and modem-equipped computers. The telecommunications satellite 10 provides a multibeam rf communications link with the mobile cellular telephones 14 using two multibeam antennas 16, 18 and an rf communications link with the gateway station 12 using two antennas 20, 22. Multibeam antenna 16 receives rf signals from the mobile cellular telephones 14 on frequency band $F_1$. The satellite 10 then amplifies, translates and transmits the rf signals down to the gateway station 12 on frequency band $F_2$ using antenna 20. The gateway station 12 is connected by trunk lines to a local and long distance telephone network 24, which provides connections to a fixed telephone 26. RF signals are transmitted from the gateway station 12 back to the telecommunications satellite 10 on frequency band $F_3$ and received using antenna 22. The satellite 10 then amplifies, translates and transmits the rf signals back down to the mobile cellular telephones 14 on frequency band $F_4$ using multibeam antenna 18.

Various types of connections are possible between the different users of the cellular telecommunications system of the present invention. A mobile telephone user can communicate with another mobile telephone user in the same service region of the satellite 10 or in the service region of another satellite 10, or with a fixed telephone user located anywhere in the world. If in communication with another mobile telephone user in the same service region, the rf signals are transmitted up from the mobile cellular telephone 14 to the satellite 10, then down to the gateway station 12, then back up to the satellite 10, and then down to the other mobile cellular telephone 14, and vice versa. This type of connection requires a double hop, which doubles the propagation time delay. If in communication with another mobile telephone user in a different service region, the rf signals are transmitted up from the mobile cellular telephone 14 to the satellite 10, then down to the gateway station 12, then through the local and long distance network 24, as necessary, to the gateway station 12 responsible for the other service region, then up to the satellite 10 responsible for the other service region, and then down to the other mobile cellular telephone 14, and vice versa. This type of connection also requires a double hop. If in communication with a fixed telephone user, the rf signals are transmitted up from the mobile cellular telephone 14 to the satellite 10, then down to the gateway station 12, and then through the local and long distance network 24, as necessary, to the fixed telephone 26, and vice versa. This type of connection required only a single hop.

In an alternative embodiment of the present invention, the satellite 10 performs the function of the gateway station 12 for communications between mobile telephone users located in the same service region, thus requiring only a single hop. In this type of connection, the rf signals are transmitted up from the mobile cellular telephone 14 to the satellite 10, the satellite 10 then performs signal processing on the rf signals to provide any necessary switching between the multiple beams, and then the rf signals are transmitted back down to the other mobile cellular telephone 14, and vice versa.

The propagation time delay depends on the altitude of the telecommunications satellite 10 and the location of the mobile cellular telephones 14 in the service region. In the present invention, at an altitude of between 5600 and 10,000 nautical miles, the time delay from the satellite 10 to the ground and vice versa is limited to 60 msec. Therefore, the single hop time delay is limited to 120 msec. At an altitude of 5600 nautical miles, the one hop time delay between two mobile cellular telephones 14 located directly below the satellite 10 is 69 msec., while the one hop time delay between two mobile cellular telephones 14 spaced apart at the minimum elevation angle of 10° is 96 msec.

The relationship between station to station propagation time and satellite altitude for a single hop from a station on the ground up to the satellite and back down to the station at maximum range, which occurs when the satellite 30 is at a minimum elevation of 10°, may be shown as follows:

| Satellite Altitude naut. mi. | Maximum Station to Satellite Propagation Range naut. mi. | Maximum Station to Station Propagation Range msec. |
| --- | --- | --- |
| 5500 | 7656 | 94 |
| 6000 | 8191 | 101 |
| 6500 | 8724 | 108 |
| 7000 | 9255 | 115 |
| 7500 | 9782 | 121 |

The mobile cellular telephones 14 and the gateway station 12 are within view of the satellite 10 at all times at an elevation angle of at least 10°. As the satellite 10 moves out of view of the mobile cellular telephones 14 in a particular service region, another satellite 10 from a constellation comes into view. Each satellite 10 has a relatively narrow antenna footprint that is considerably smaller than the total area of visibility of the satellite. This is because it is not practical to serve the entire area of visibility due to power and complexity constraints.

The service region actually covered by the satellite 10 is determined by the composite coverage of the multibeam antennas 16, 18 has 19 beams for a composite footprint coverage of about 23°. Another ring of feeds can be added to the multibeam antenna to provide 37 beams for a composite footprint coverage of about 35°. Each beam has field of view (FOV) of about 5° and is capable of operating with ½ W mobile cellular telephone 14 have an omnidirectional antenna.

The present invention also includes several additional features which essentially eliminate beam-to-beam and satellite-to-satellite handovers, thus dramatically reducing the likelihood of dropouts. One of these important features is an assignment of each satellite to a sequence of fixed service regions during each satellite's orbit. The boresight of the satellite's antennas 16, 18 remains centered on the assigned service region is visible to the satellite with respect to antennas 20, 22 they are gimballed to point to the appropriate gateway station. The resulting nearly-fixed antenna beam pattern practically eliminates beam-to-beam handovers. The antenna boresight remains centered on the service region either by adjusting the attitude of the spacecraft 10 or by rotating gimballed antennas.

Another one of the important features of the present invention is a provision for overlap in the coverage of each service region by two successive satellites during the transition in service from one satellite to another. All calls that are placed during the overlap interval are assigned to the arriving satellite. Therefore, only calls placed prior to the overlap interval and extending beyond the overlap interval are subjected to satellite-to-satellite handovers when the departing satellite is reoriented to its new service region.

In several embodiments of the present invention, the constellation of telecommunications satellites 10 has three inclined orbital planes which are evenly spaced about the earth with ascending nodes at 120° intervals about the equator. The satellites 10 are placed in medium earth orbit at an altitude of between 5600 and 10,000 nautical miles. This range of altitudes is above the Van Allen radiation belt, but substantially below the altitude for geosynchronous orbit. This provides good visibility with a minimum number of satellites without excessive power requirements. At least one of the telecommunications satellites 10 is visible at all times from each mobile cellular telephone 14 and gateway station 12 at an elevation angle of at least 10° to prevent shadowing.

FIG. 2 shows a constellation of nine satellites which provides global land mass coverage of the earth by at least one satellite 10 at all times with a minimum elevation angle of 10°. The nine satellites are arranged in three circular orbital planes $P_1$, $P_2$, $P_3$, with three satellites 30a–30c located in orbital plane $P_1$, three satellites 32a–32c located in orbital plane $P_3$, and three satellites 34a–34c located in orbital plane $P_3$. The satellites are evenly spaced at 120° intervals in each orbital plane at an altitude of 5600 nautical miles. Each orbital plane is inclined at an angle of 55° relative to the equatorial plane. The relative phase angles between the satellites in different orbital planes is 80°. Therefore, before one satellite in the constellation disappears from a user's view, at least one additional satellite comes into view above an elevation angle of 10°.

FIG. 3 shows a constellation of twelve satellites which provides global land mass coverage of the earth by at least two satellites at all times with a minimum elevation angle of 10°. The twelve satellites are arranged in the three circular orbital planes $P_1$, $P_2$, $P_3$, with four satellites 30a–30d located in orbital plane $P_1$, four satellites 32a–32d located in orbital plane $P_2$ and four satellites 34a–34d located in orbital plane $P_3$. The satellites are evenly spaced at 90° intervals in each orbital plane at an altitude of 5600 nautical miles. Each orbital plane is inclined at an angle of 55° relative to the equatorial plane. The relative phase angles between satellites in different orbital planes is 90°.

A constellation of telecommunications satellites in circular orbits is preferred for providing global coverage, but a constellation of telecommunications satellites in elliptical orbits is preferred for coverage of limited areas, such as one hemisphere. FIG. 4 shows a constellation of six satellites which provides hemispheric coverage of the earth by at least one satellite at all times with a minimum elevation angle of 10°. The six satellites are arranged in three elliptical orbital planes P4, P5, P6, with two satellites 30a–30b located in orbital plane P4, two satellites 32a–32b located in orbital plane P5 and two satellites 34a–34b located in orbital plane P6. Each orbital plane is defined by an apogee altitude of 6300 nautical miles, a perigee altitude of 600 nautical miles, an inclination angle of 63.4°, an ascending node spacing of 120°, an argument of perigee of 270°, and a relative phase angle between satellites in different orbits of 180°. By placing the apogee at the northernmost latitude reached by the satellite, which is also equal to the inclination angle, the coverage period for the northern latitude is maximized.

FIG. 5 shows a constellation of nine satellites which provides hemispheric coverage of the earth by at least two satellites at all times with a minimum elevation angle of 10°. The nine satellites are arranged in three elliptical orbital planes $P_4$, $P_5$, $P_6$, with three satellites 30a–30c located in orbital plane $P_4$, three satellites 32a–32c located in orbital plane $P_5$ and three satellites 34a–34c located in orbital plant $P_6$. Each orbital plane is defined by an apogee altitude of 6300 nautical miles, a perigee altitude of 600 nautical miles, an inclination angle of 63.4°, an ascending node spacing of 120°, an argument of perigee of 270°, and a relative phase angle between satellites in different orbits of 180°.

|  | Coverage | | | |
|---|---|---|---|---|
|  | Global | | Hemispheric | |
|  | Single | Double | Single | Double |
| Number of Satellites | 9 | 12 | 6 | 9 |
| Number Orbital Planes | 3 | 3 | 3 | 3 |
| Satellites per Plane | 3 | 4 | 2 | 3 |

-continued

|  | Coverage | | | |
|---|---|---|---|---|
|  | Global | | Hemispheric | |
|  | Single | Double | Single | Double |
| Apogee Altitude (nm) | 5600 | 5600 | 6300 | 6300 |
| Perigee Altitude (nm) | 5600 | 5600 | 600 | 600 |
| Inclination Angle | 55° | 55° | 63.4° | 63.4° |
| Ascending Node Spacing | 120° | 120° | 120° | 120° |
| Argument of Perigee | 0° | 0° | 270° | 270° |
| Relative Phase Angle | 80° | 90° | 180° | 180° |
| Minimum Elevation Angle | 10° | 10° | 10° | 10° |

The constellations providing single satellite coverage can be initially formed and then the coverage expanded later to provide double coverage by the addition of only three satellites. Conversely, the constellations providing double coverage allow for the failure of one satellite in each orbital plane without the loss of full service. The position of the remaining satellites in the orbital plane can be adjusted to provide single coverage until the satellite is repaired or replaced.

FIG. 6 shows a original constellation of six satellites which provides continuous, 24-hour satellite visibility (above 10° elevation angle) to all users located in the latitude bands ±(20° to 45°). The six satellites are arranged in three circular orbital planes $P_7$, $P_8$, $P_9$, with two satellites 40a–40b located in orbital plane $P_7$, two satellites 42a–42b located in orbital plane $P_8$, and two satellites 44a–44b located in orbital plane $P_9$. The satellites are evenly spaced at 180° intervals in each orbital plane at an altitude of 5600 nautical miles. Each orbital plane is inclined at an angle between 50° and 55° relative to the equatorial plane, with a 53° inclination being the most preferred. The relative phase angles between the satellites in different orbital planes is 0°.

Figure 7:
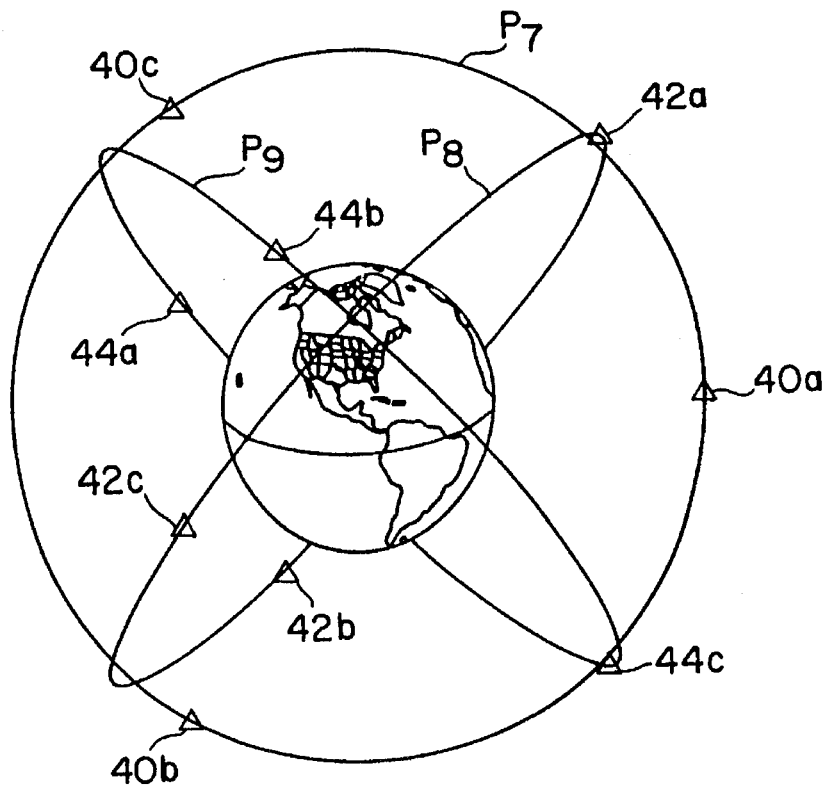
FIG. 7 is a schematic illustration of a follow-on constellation of telecommunication satellites which provides further coverage of the earth.

FIG. 7 shows the growth of the original constellation to a follow-on constellation of nine satellites. As shown in FIG. 7, three new satellites have been added to the constellation, such that each of the orbital planes $P_7$, $P_8$, $P_9$ include one additional satellite. In other words, orbital plane $P_7$ includes satellites 40a–40c, orbital plane $P_9$ includes satellites 42a–42c, and orbital plane $P_9$ includes satellites 44a–44c. The satellites in each of these orbitals planes are preferably evenly spaced at 120° intervals. Thus, it should be appreciated that at least some of the satellites from the original configuration will need to be relocated from the original 180° interval.

Figure 8:
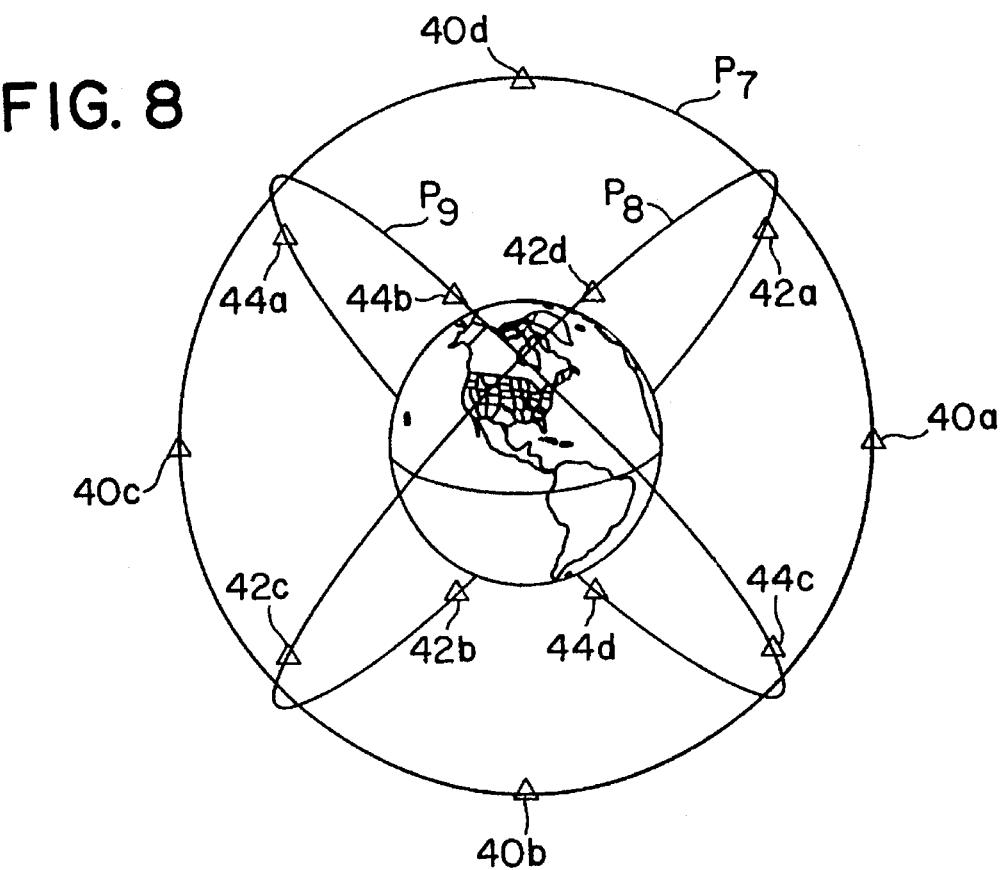
FIG. 8 is a schematic illustration of a full baseline constellation of telecommunication satellites which provides complete land mass coverage of the earth.

This concept of continuing to launch additional satellites beyond the original constellation in order to provide greater coverage leads to the full baseline satellite constellation of FIG. 8. A full baseline satellite constellation is one in which complete land mass (including coastal area) coverage can be achieved. As shown in FIG. 8, the full baseline satellite-based telecommunications system will preferably include twelve satellites. Accordingly, it should be appreciated that only six satellite launches will be required if the dual launch method is employed. In the full satellite constellation of FIG. 8, each of the orbital planes $P_7$, $P_8$, $P_9$ include four satellites which are equally spaced at 90° intervals. Thus, for example, orbital plane $P_7$ is shown to include satellites 40a–40d.

In both the follow-on constellation and the full constellation, the preferred inclination angle of the satellites will remain unchanged at 53° relative to the equatorial plane. Similarly, the orbital altitude of the satellites in all cases will preferably remain at 5600 nautical miles. However, in the follow-on constellation, the relative phase angle between satellites in different orbital planes is preferably 0°, while the relative phase angle for the full baseline satellite constellation is preferably 30° (e.g., a 12/3/1 satellite constellation). With these configurations, the follow-on constellation will provide continuous 24-hour satellite visibility in the latitude range between 10° and 70° (at a minimum elevation angle of 10°), while the full baseline constellation will provide continuous 24-hour satellite visibility in the latitude range between 0° and 90° (at a minimum elevation angle of 10°).

In accordance with the present invention, it is important to understand that there is a significant difference between satellite visibility and satellite coverage or availability. This is because the satellites according to the present invention are capable of employing an antenna FOV which is less than the FOV for the satellite itself. For example, at the preferred altitude of 5600 nautical miles, the FOV for each of the satellites will be 44°. However, the satellites 40a–40d, 42a–42d and 44a–44d need only employ multibeam antennas that provide a FOV in a 38° to 40° range. While this difference in degrees may seem relatively small, it actually has a significant effect on the size of ground area that can be covered without the coordinated boresight steering method according to the present invention.

Figure 9:
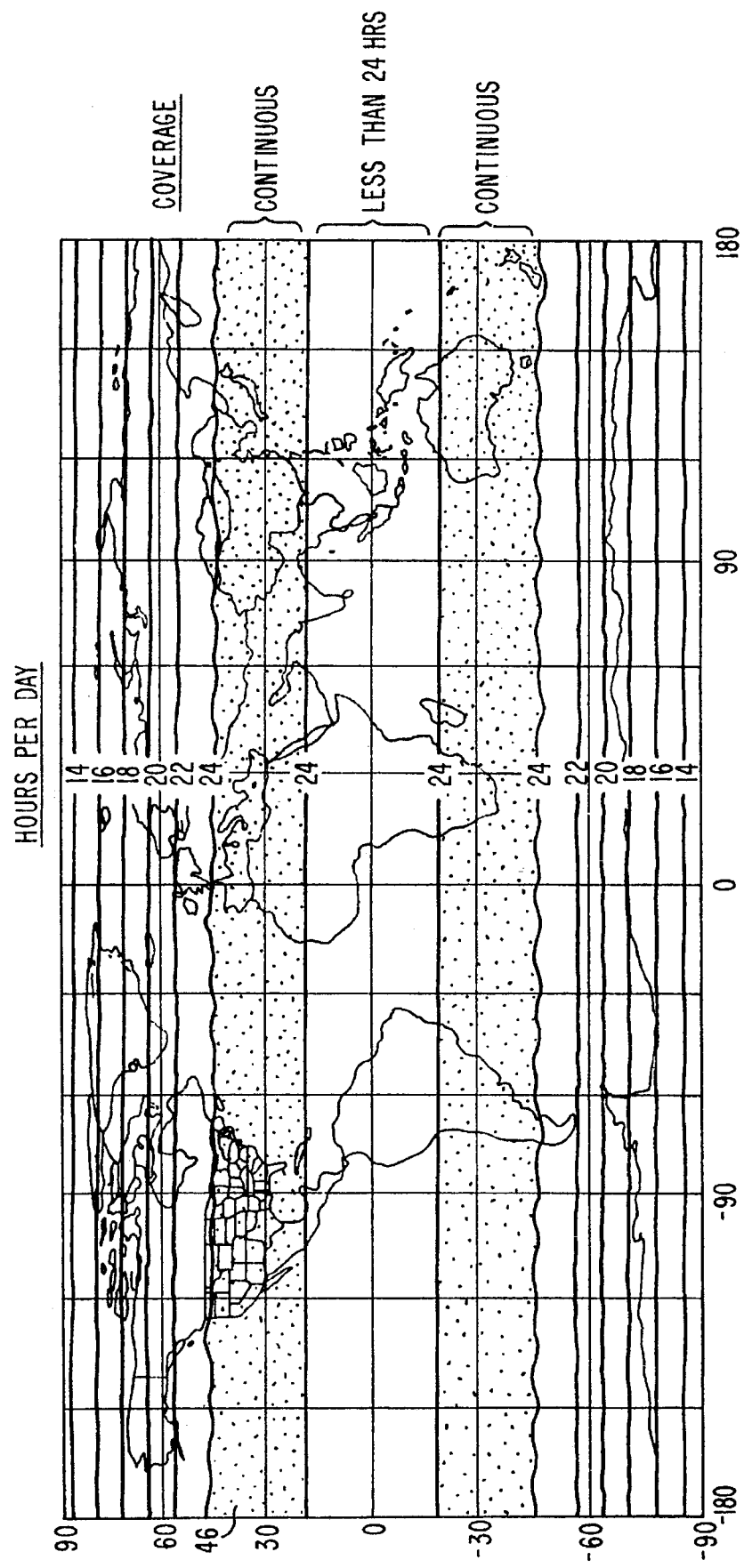
FIG. 9 is a cartographic illustration of satellite visibility using the original constellation of FIG. 6.
Figure 10:
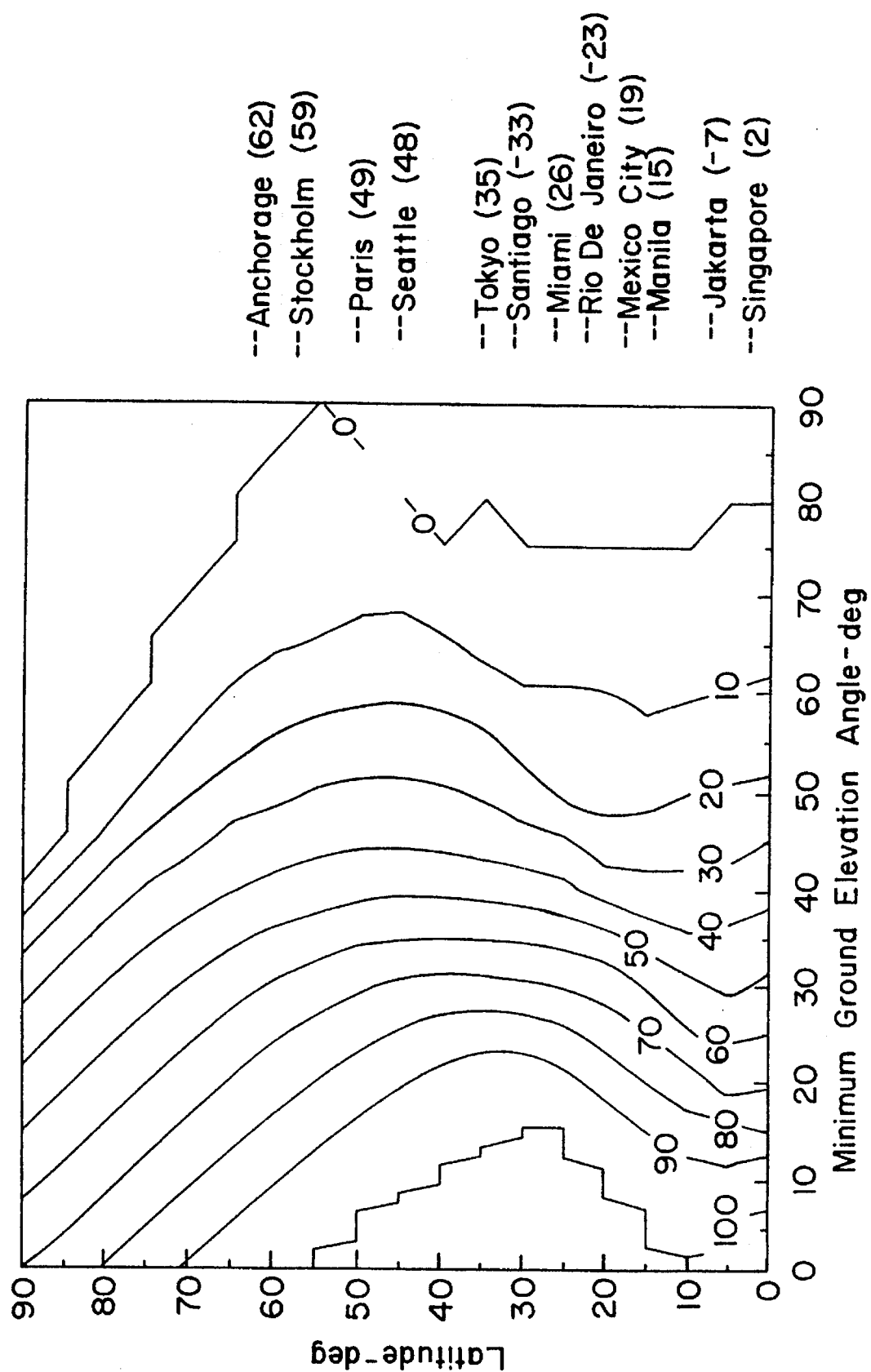
FIG. 10 is a graphical illustration of satellite coverage using the original constellation of FIG. 6.
Figure 11:
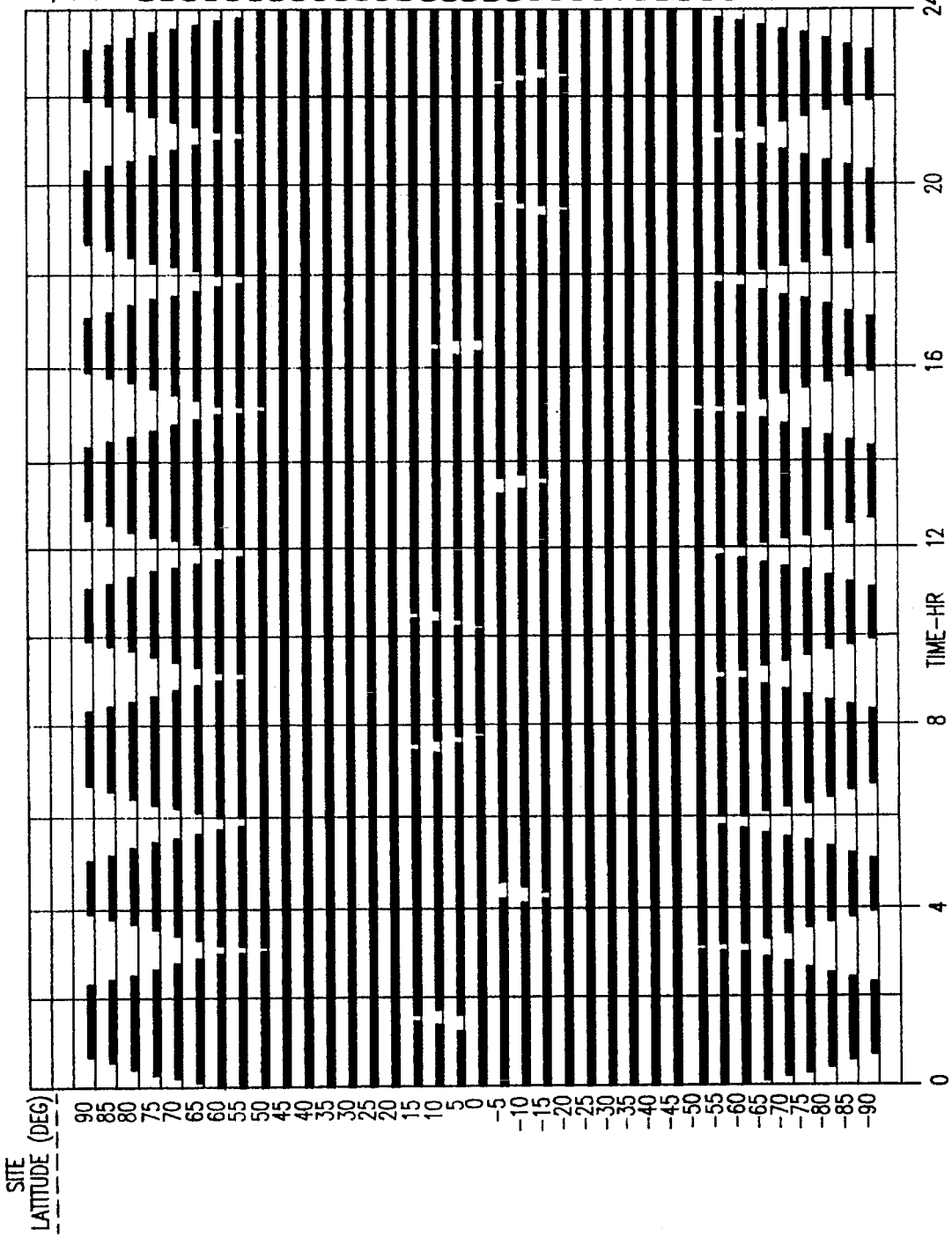
FIG. 11 is another graphical illustration of satellite coverage using the original constellation of FIG. 6.

FIGS. 9–11 illustrate satellite visibility for the original constellation of FIG. 6. In this regard, FIG. 9 shows a map of the earth in which the time periods of satellite visibility are superimposed for the original constellation. The shaded areas illustrate the latitude bands where continuous 24-hour satellite visibility is provided. Thus, for example, the upper shaded area 46 shows that the six satellites of the original constellation will provide continuous visibility across almost all of the United States and Southern Europe. Similarly, the column labeled Hours Per Day shows the number of hours in each day that at least one of the original constellation satellites will be seen from the ground.

FIG. 10 shows the percent of time that satellite visibility can be provided according to the present invention across all latitude bands. Thus, for example, at a minimum elevation angle of 10°, it should be understood that 100% satellite coverage will be available across a latitude range between 20° and 40°. However, if the minimum elevation angle is increased to 20°, then the percent of coverage time will be decreased as shown. Nevertheless, as the satellite-based telecommunications system grows from the original constellation to the full baseline constellation, it should be noted that the percent of continuous coverage time will increase over a considerably wider latitude band. For example, in the full baseline constellation of FIG. 8, continuous 24-hour visibility will be provided in a latitude range between 10° and 90° for a minimum elevation angle of 20°. However, again it should be noted that the land mass coverage provided in these latitude ranges is achieved in connection with the coordinated boresight steering method according to the present invention. While the FOV for the satellite antennas could be enlarged so that NADIR pointing satellites with a 42° FOV are used, this would not be as advantageous because a considerably higher antenna gain would be necessary, and the size of the antennas would be increased as well. Even though a 42° FOV is less than the 44° FOV of the satellite (full width of the earth), fixed NADIR pointing for the boresight would be acceptable for global land mass coverage. FIG. 11 shows another illustration of satellite visibility for the original constellation of FIG. 7. However, in this figure, the time gaps are graphically illustrated and quantified.

Referring now to FIGS. 12A–12E, a cartographic illustration of the "coordinated" boresight steering method according to the present invention is shown. Each of these figures show the movement and steering of the six satellites employed in the original constellation of FIG. 6 over a period of approximately one hour. For purposes of simplicity, these six satellites are labeled with reference numerals 1 through 6. This sequence of figures is based upon the satellite antennas (e.g., antennas 16 and 18) having a FOV of 40°. A shaded area is provided for each of these satellites, such as shaded area 48 for satellite 1. These shaded areas represent the 40° FOV for the satellite antennas. Each of these shaded areas include three arcuate lines, such as lines 50–54 for satellite 5. The outer line 50 represents a minimum elevation angle of 10°, the center line 52 represents an elevation angle of 20° and the inner line 54 represents an elevation angle of 30°.

Each of the satellites 1–6 in FIGS. 12A–12E also include two associated lines, such as lines 56 and 58 for satellite 5. Line 56 represents the direction of orbital travel for satellite 5, while line 58 is representative of the boresight line of sight for satellite 5 to an aim point on the ground. In other words, line 58 shows that the boresight of satellite 5 is pointed at an angle from NADIR which is greater than zero. In this case, the antennas 16–18 of satellite 5 are pointed toward North America. With a 40° FOV for the satellite antennas, it is anticipated that the maximum swing in boresight angle relative to NADIR will be approximately ±4°. This is in contrast to the wider boresight steering which is employed in the embodiments of FIGS. 1 and 2, where the anticipated that the maximum swing in boresight angle relative to NADIR will be approximately ±20°. This difference in boresight swing is due to smaller antenna FOV preferred for the embodiments of FIGS. 1 and 2 (e.g., 23°), and the use of a fixed aim point location in those embodiments.

Figure 12A:
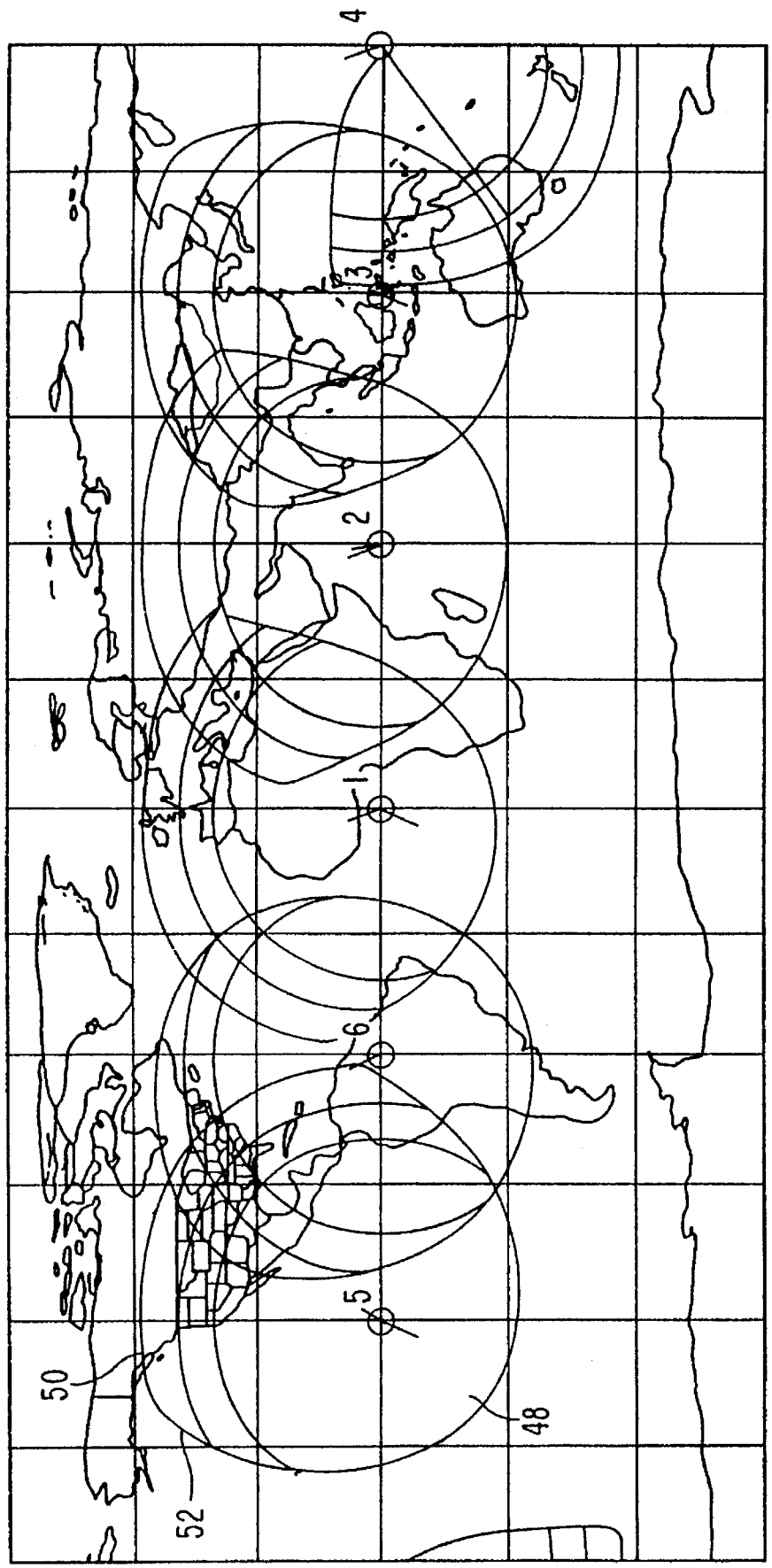
FIGS. 12A–12E provide a cartographic illustration of satellite coverage using the original constellation of FIG. 6.

As shown in FIG. 12A, satellite 5 covers almost all of the United States at a minimum elevation angle of 10°, while satellite 1 covers all but the most northern countries of Europe at this elevation angle. With respect to the United States, satellite 6 is available to cover the most north eastern of its states. Additionally, FIG. 12A shows the provision of an overlap interval between satellites 5 and 6 over the United States. In this case, satellite 5 is the arriving satellite, while satellite 6 is the departing satellite. Accordingly, as indicated above, satellite 5 will be used to handle all newly initiated telephone calls in the overlap interval with satellite 6.

Figure 12B:
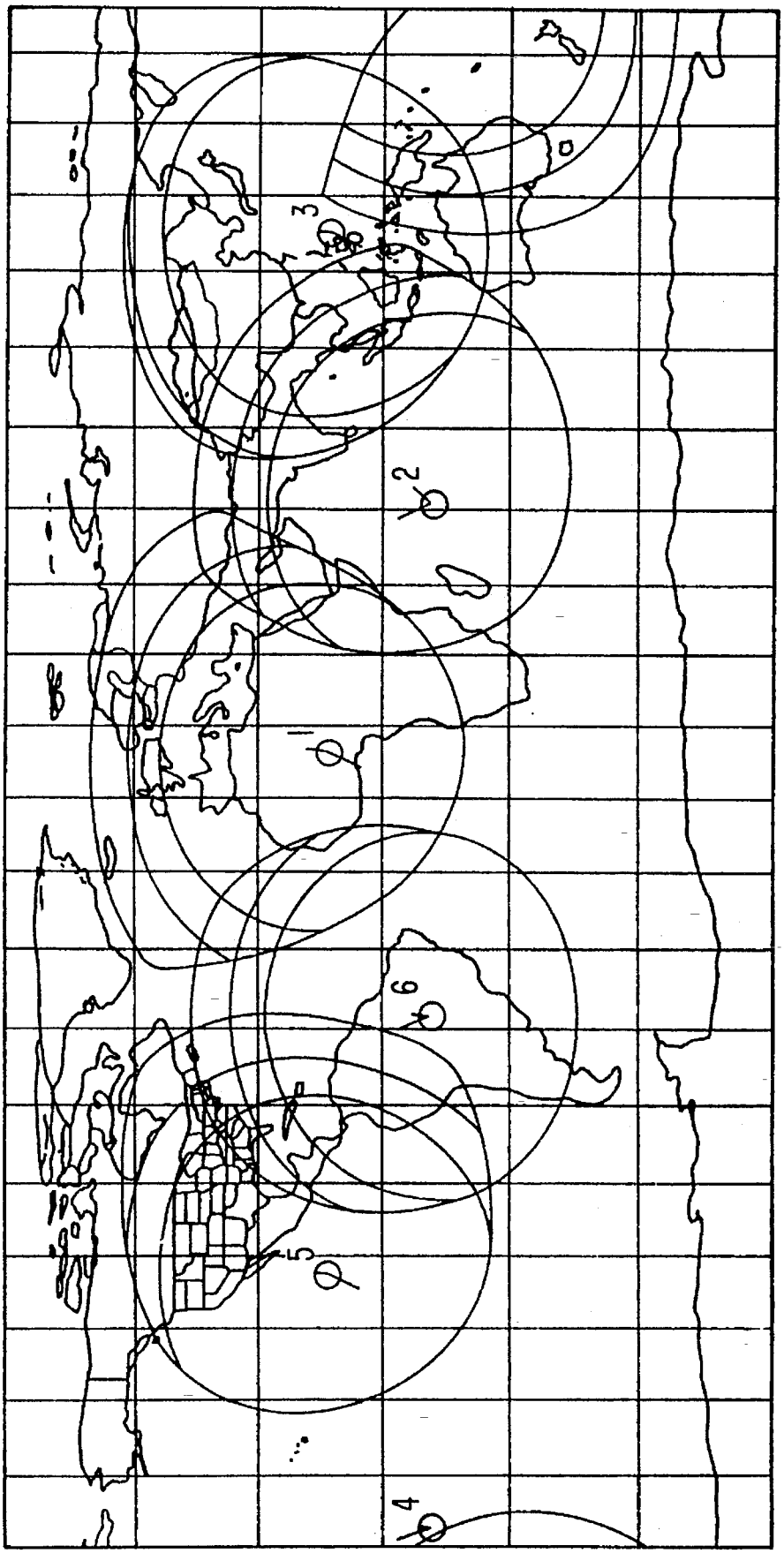
Figure 12C:
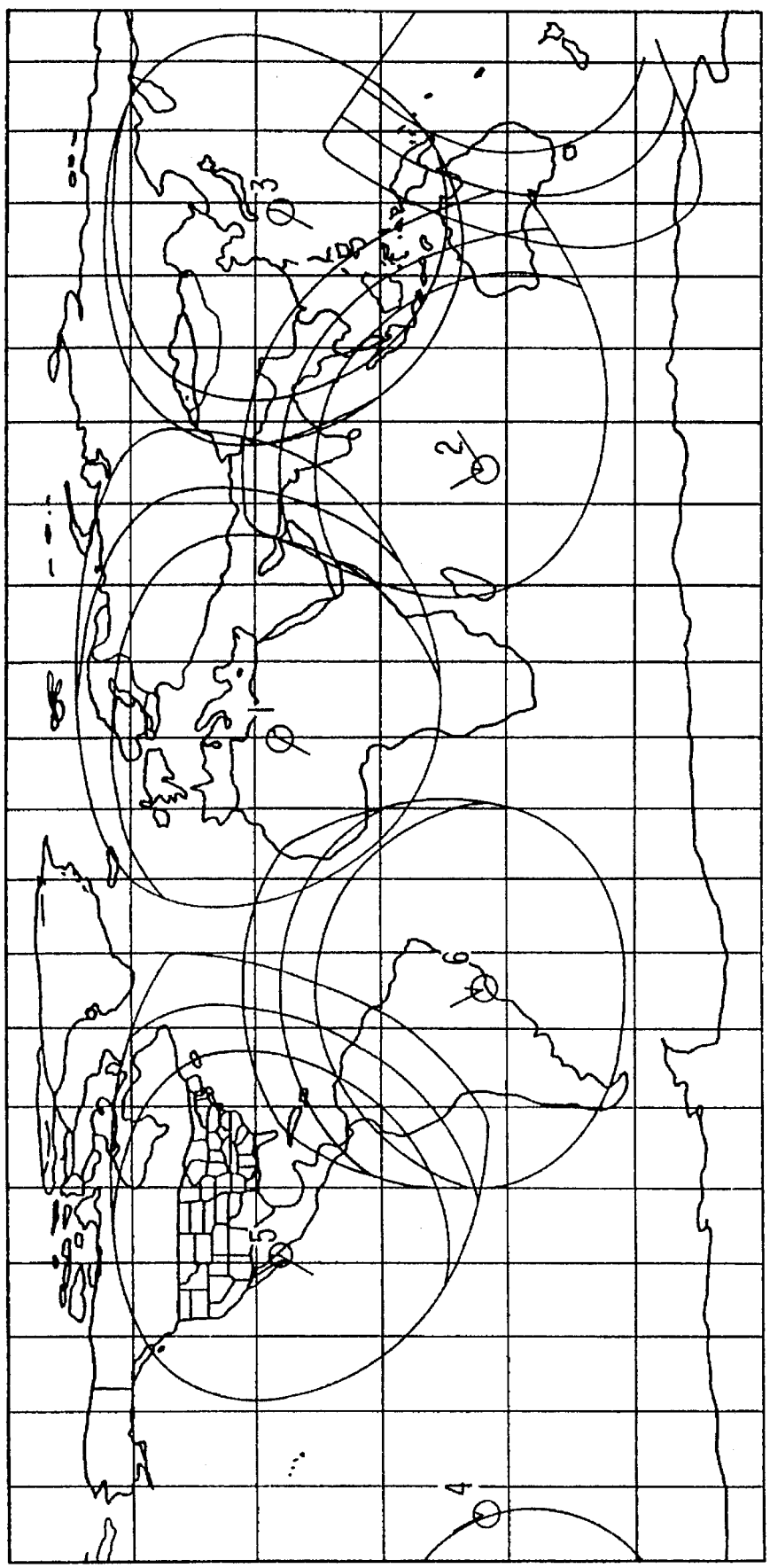
Figure 12D:
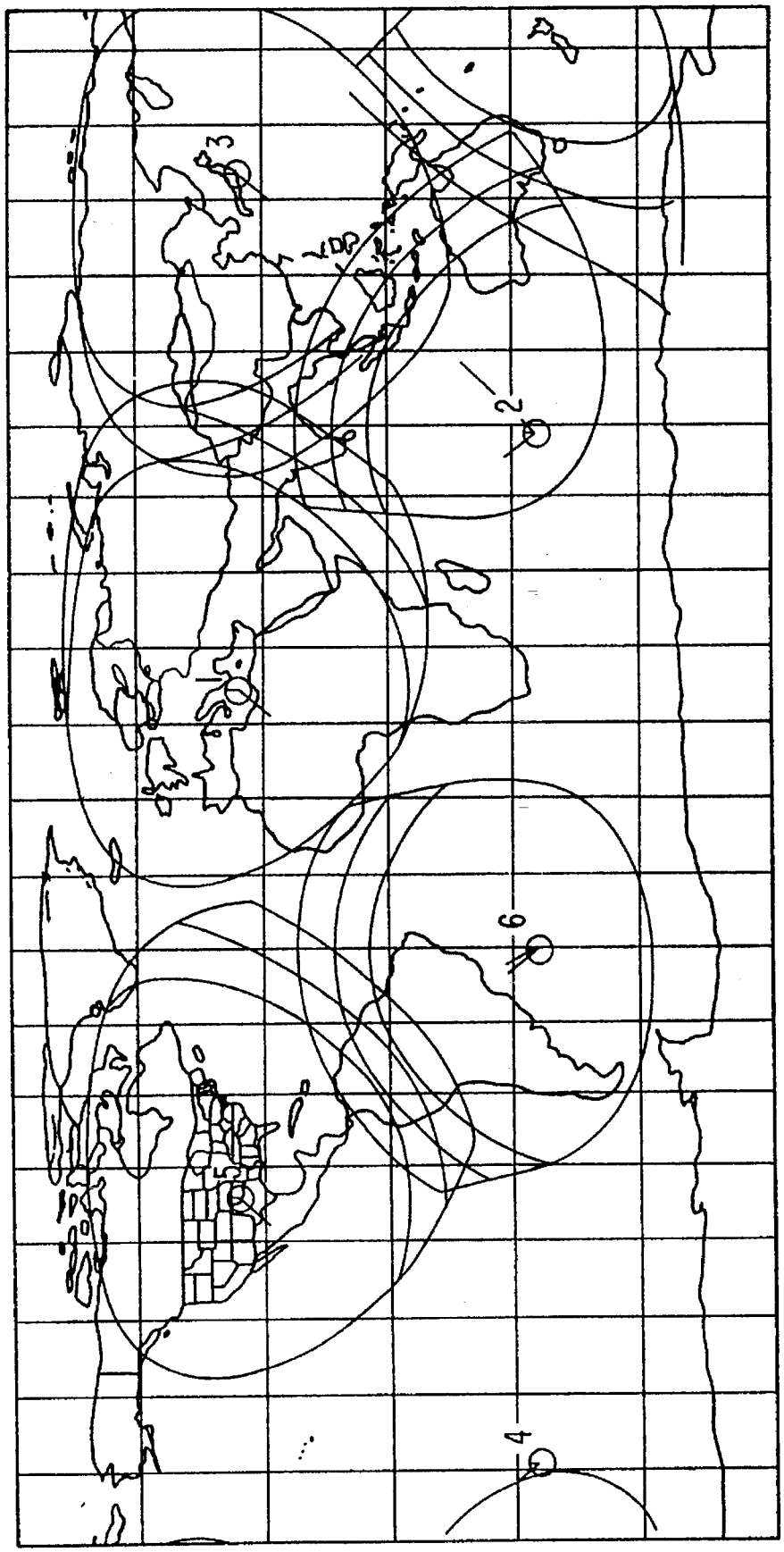
Figure 12E:
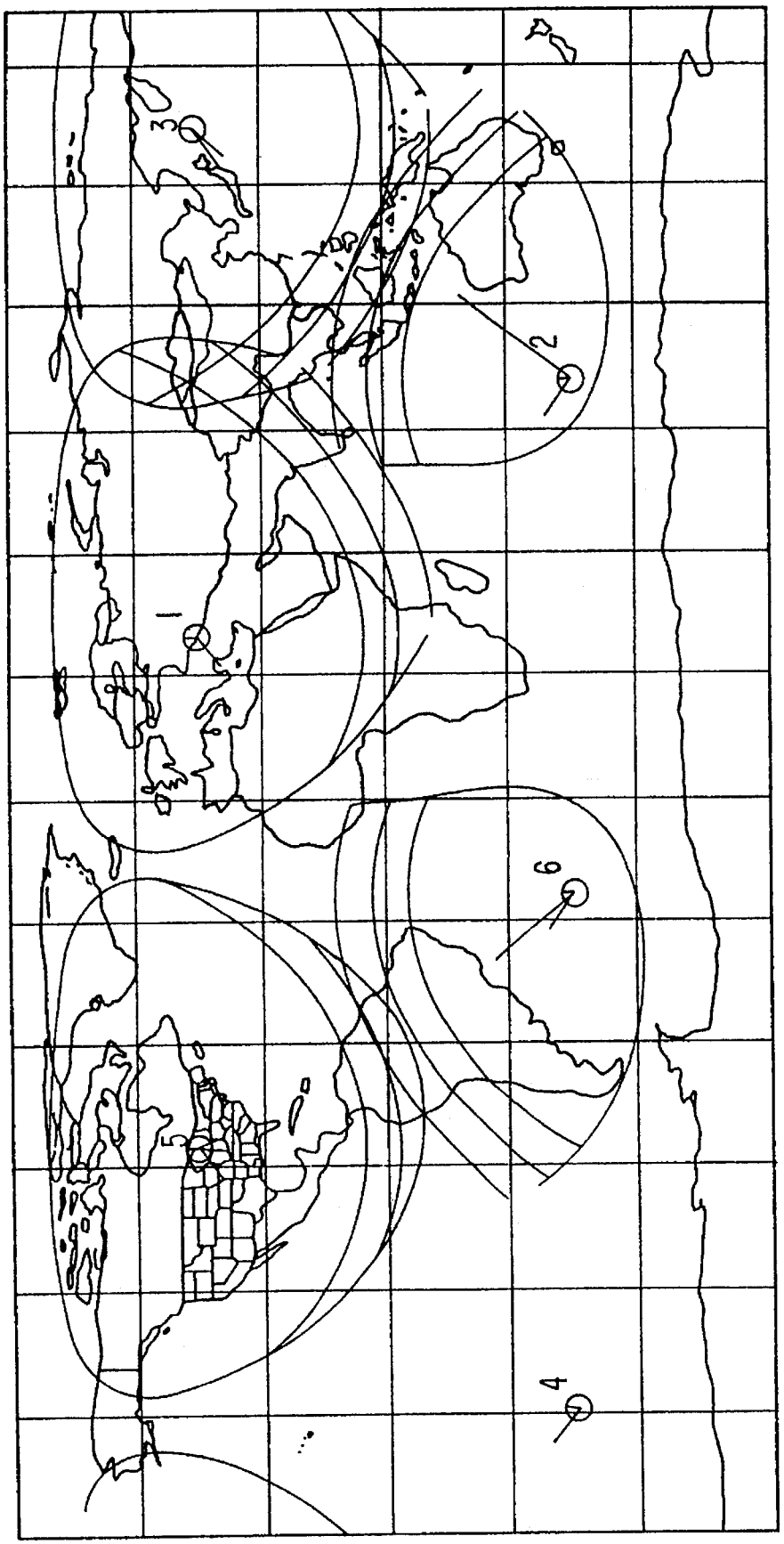
Figure 13A:
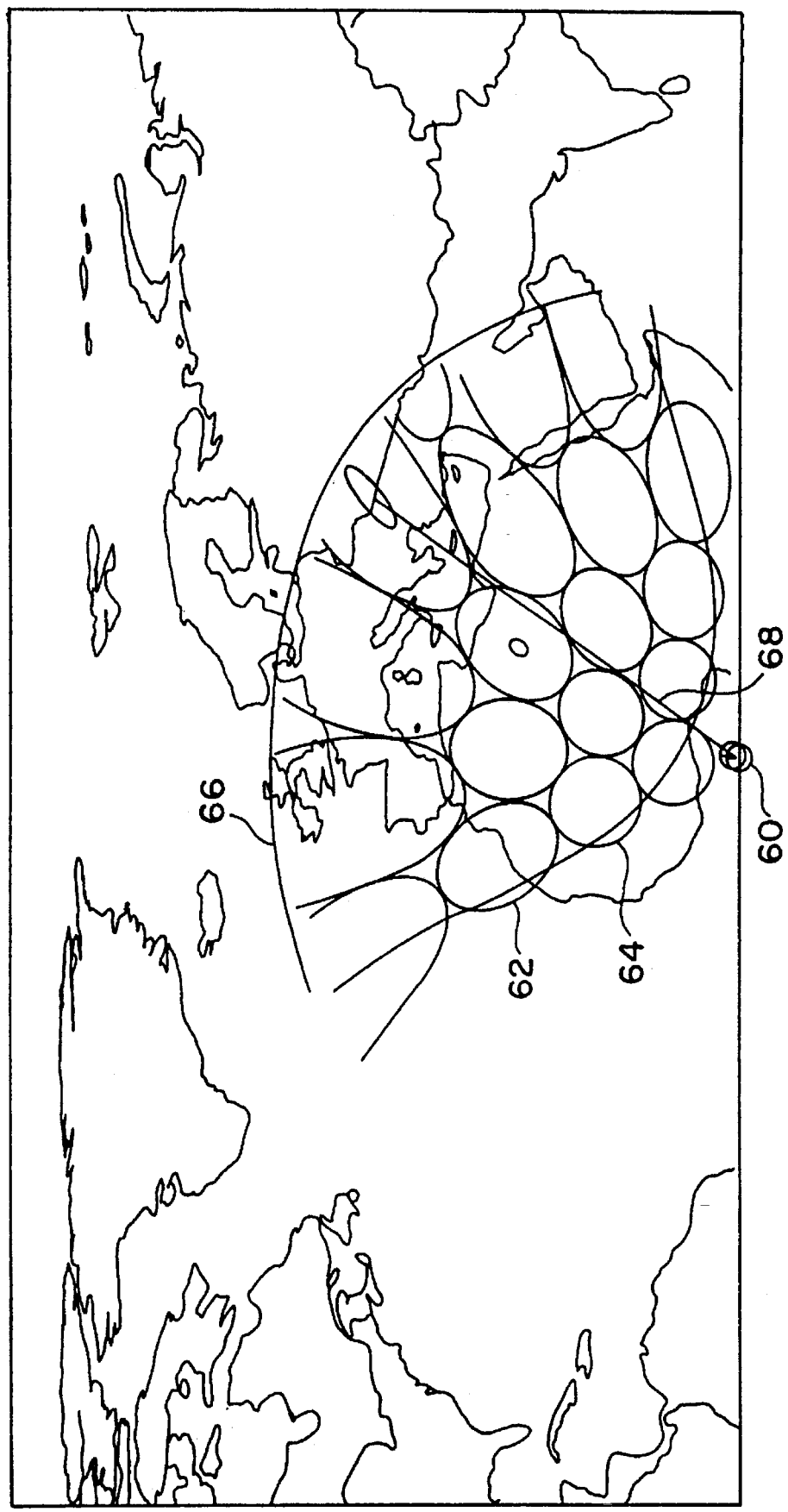
FIGS. 13A–13G provide a cartographic illustration of the variable antenna pattern using the beam-steering method according to the present invention.
Figure 13B:
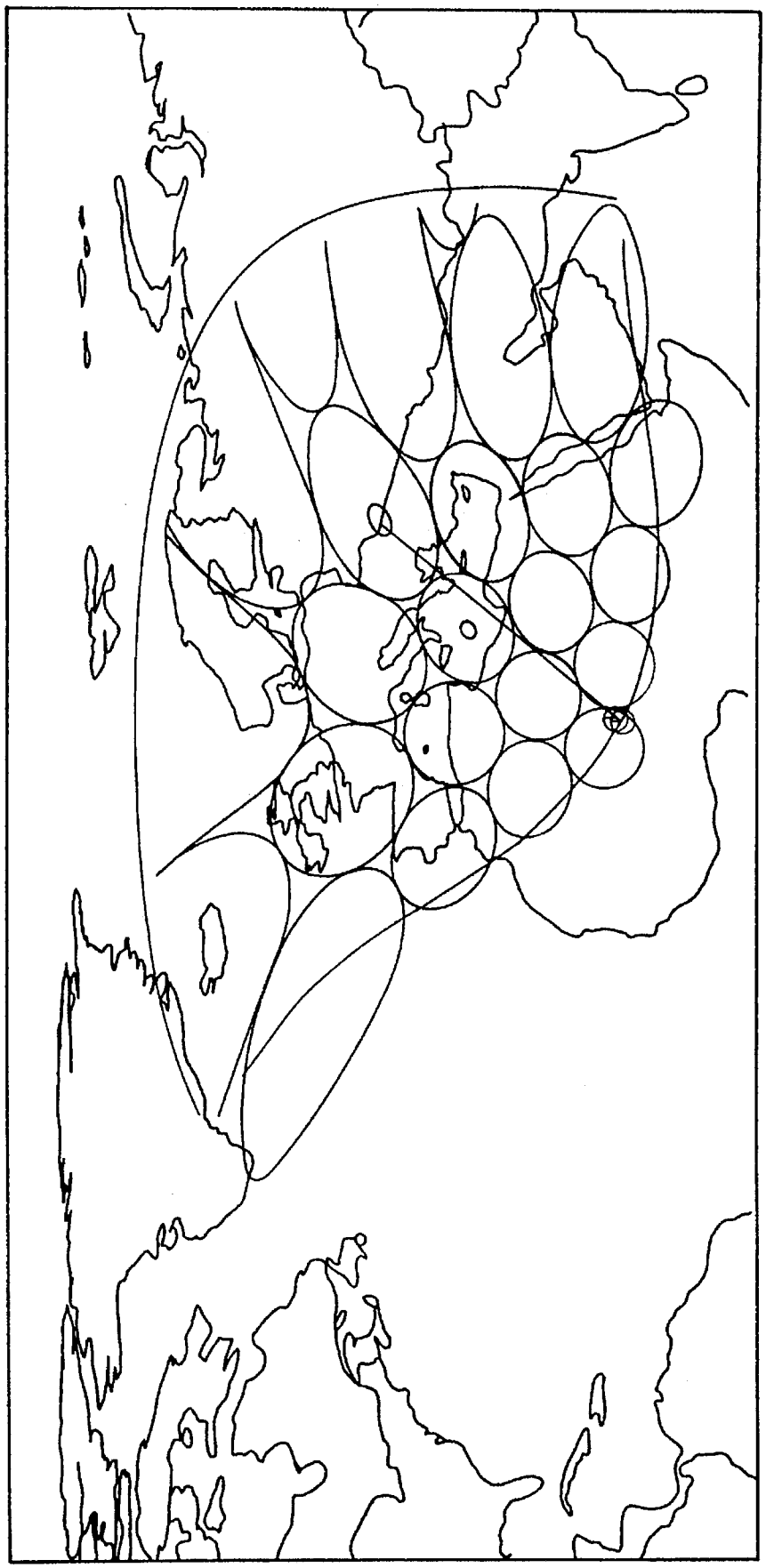
Figure 13C:
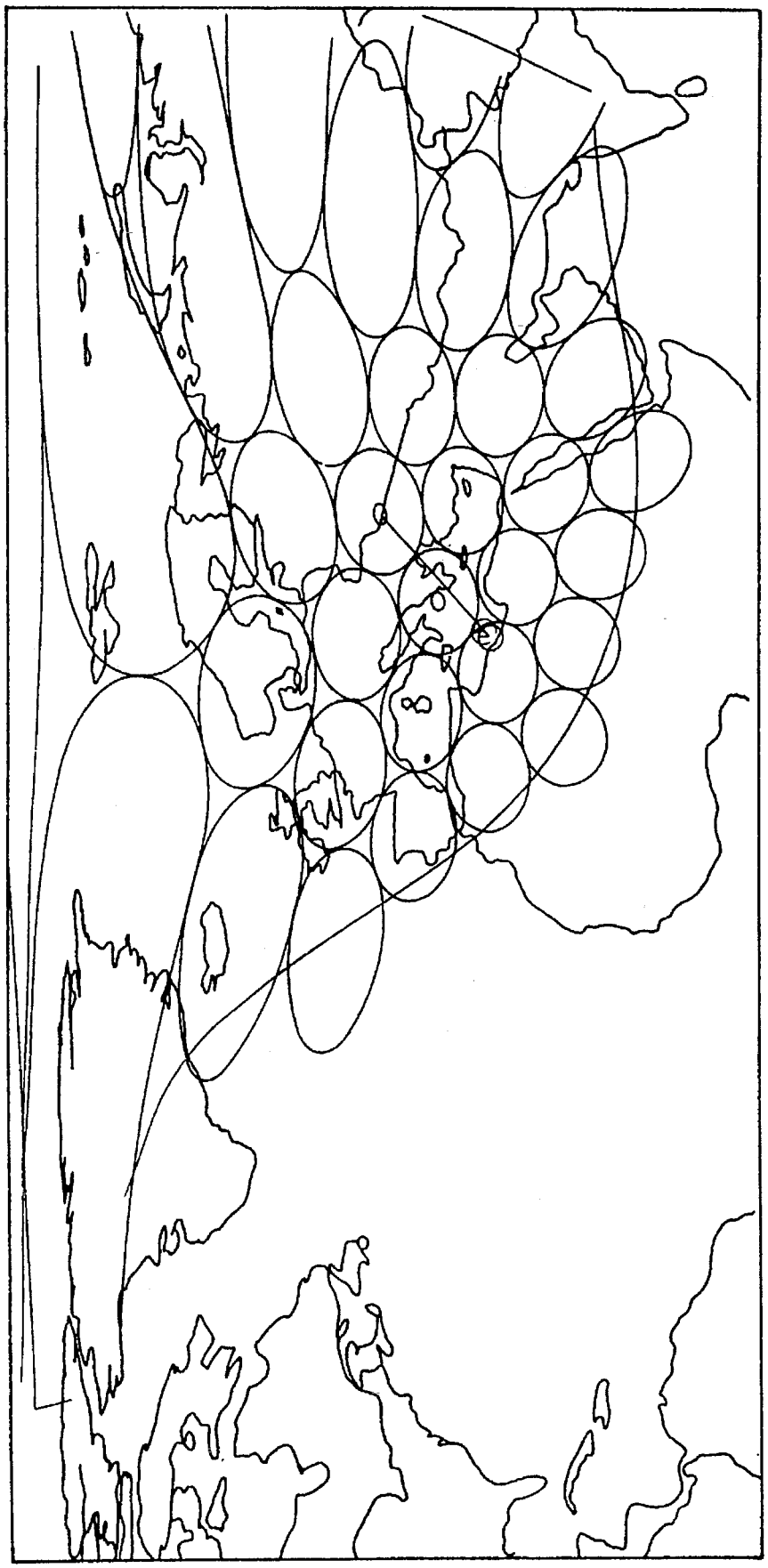
Figure 13D:
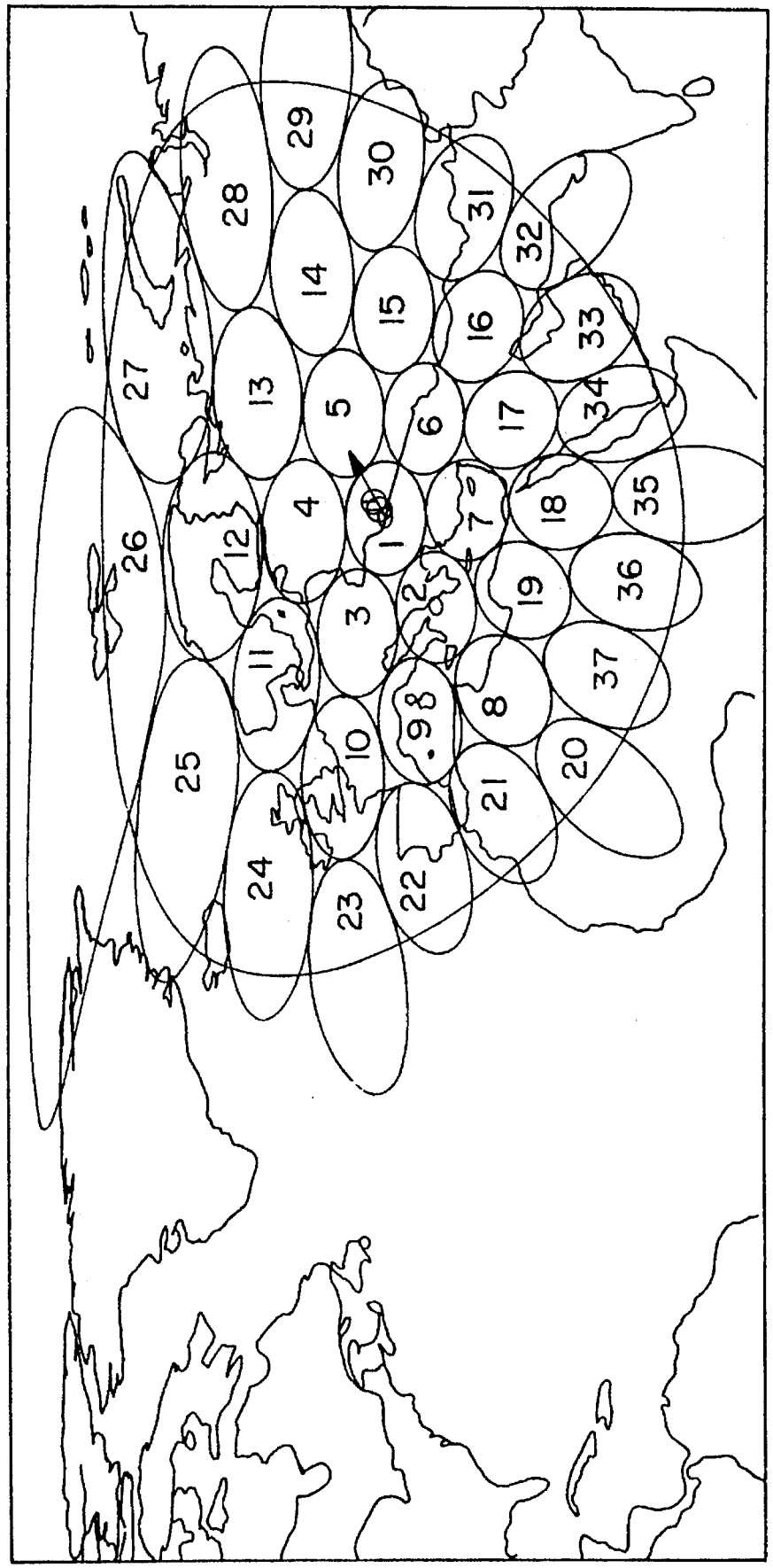
Figure 13E:
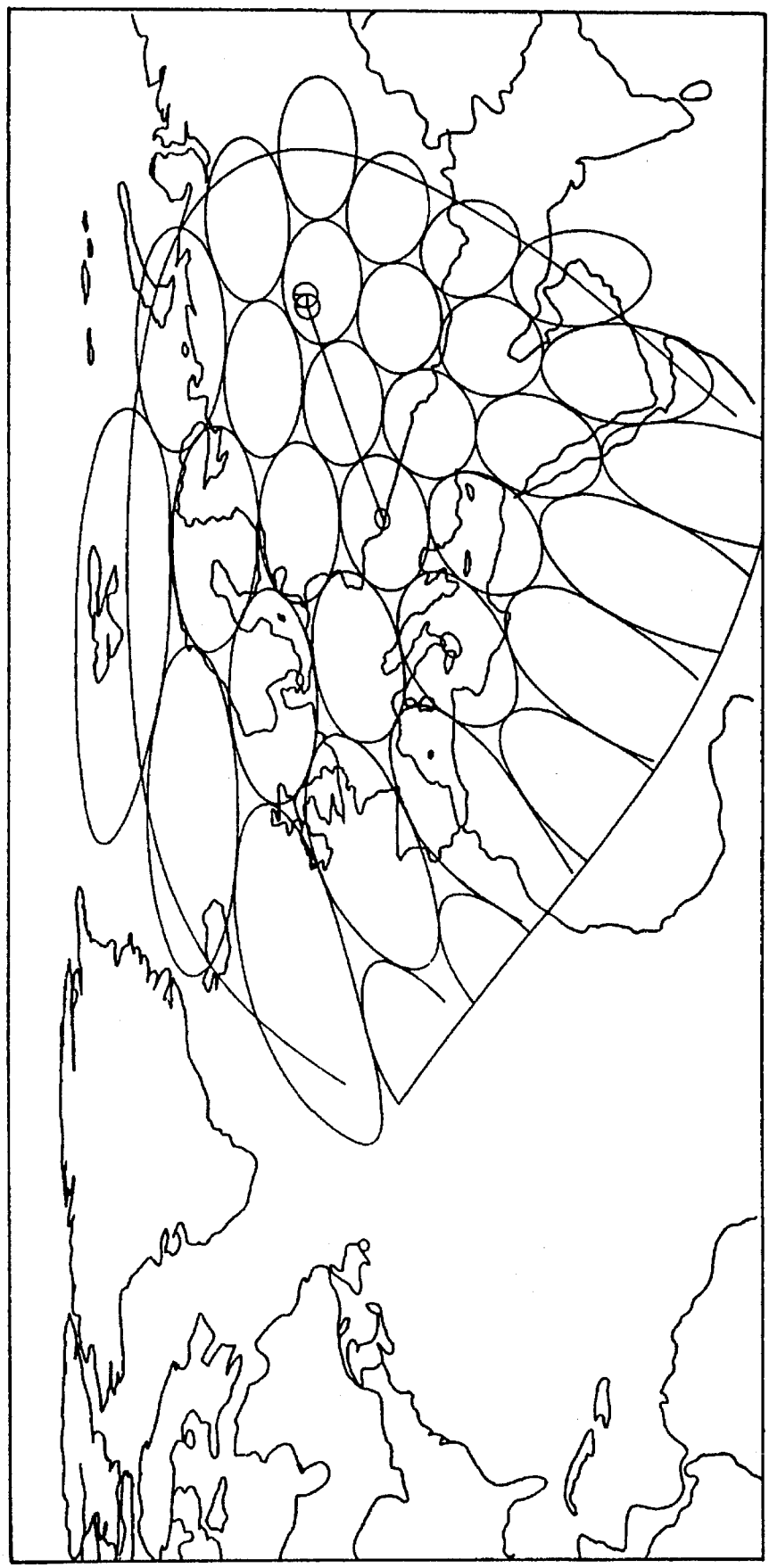
Figure 13F:
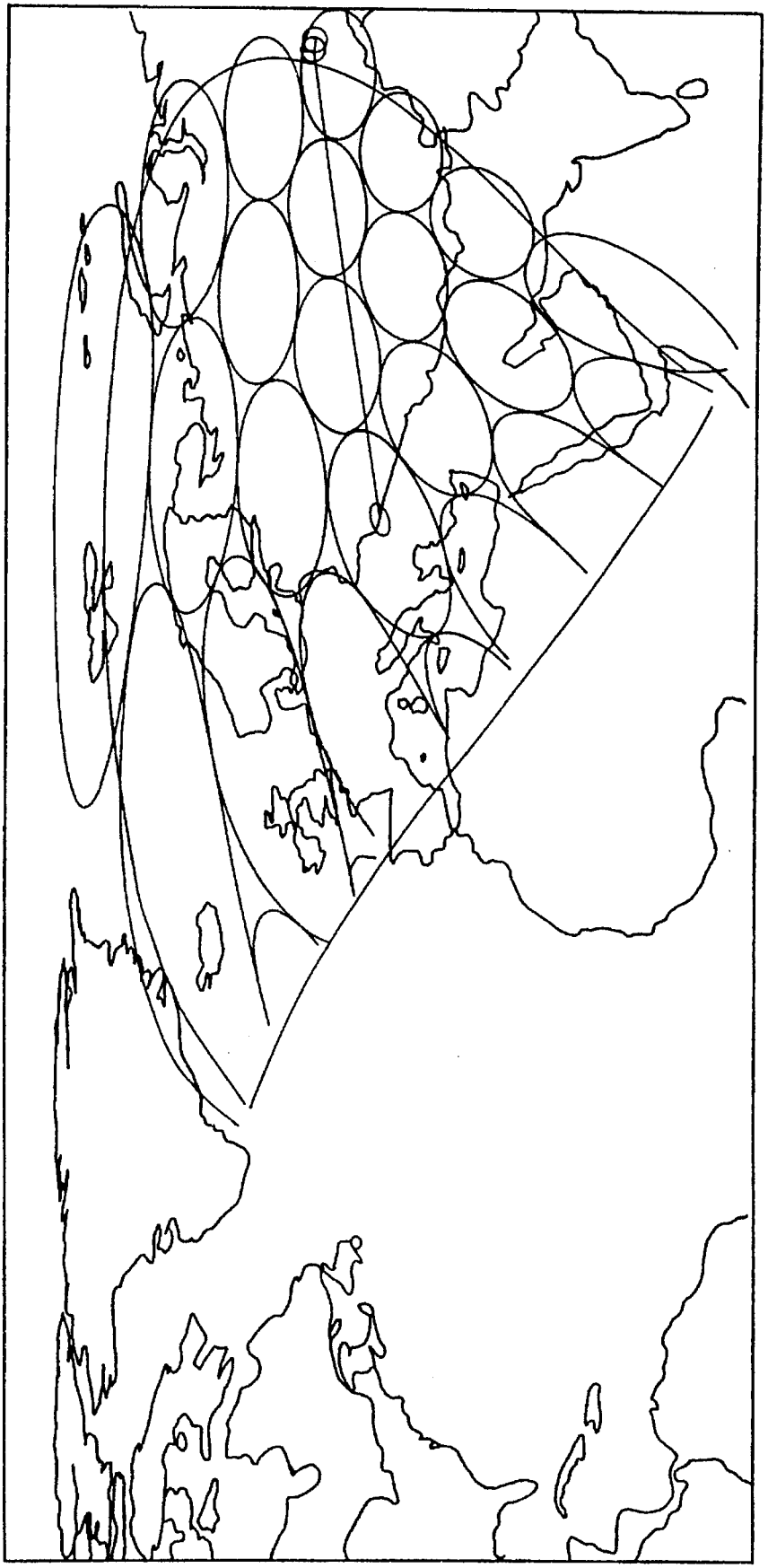
Figure 13G:
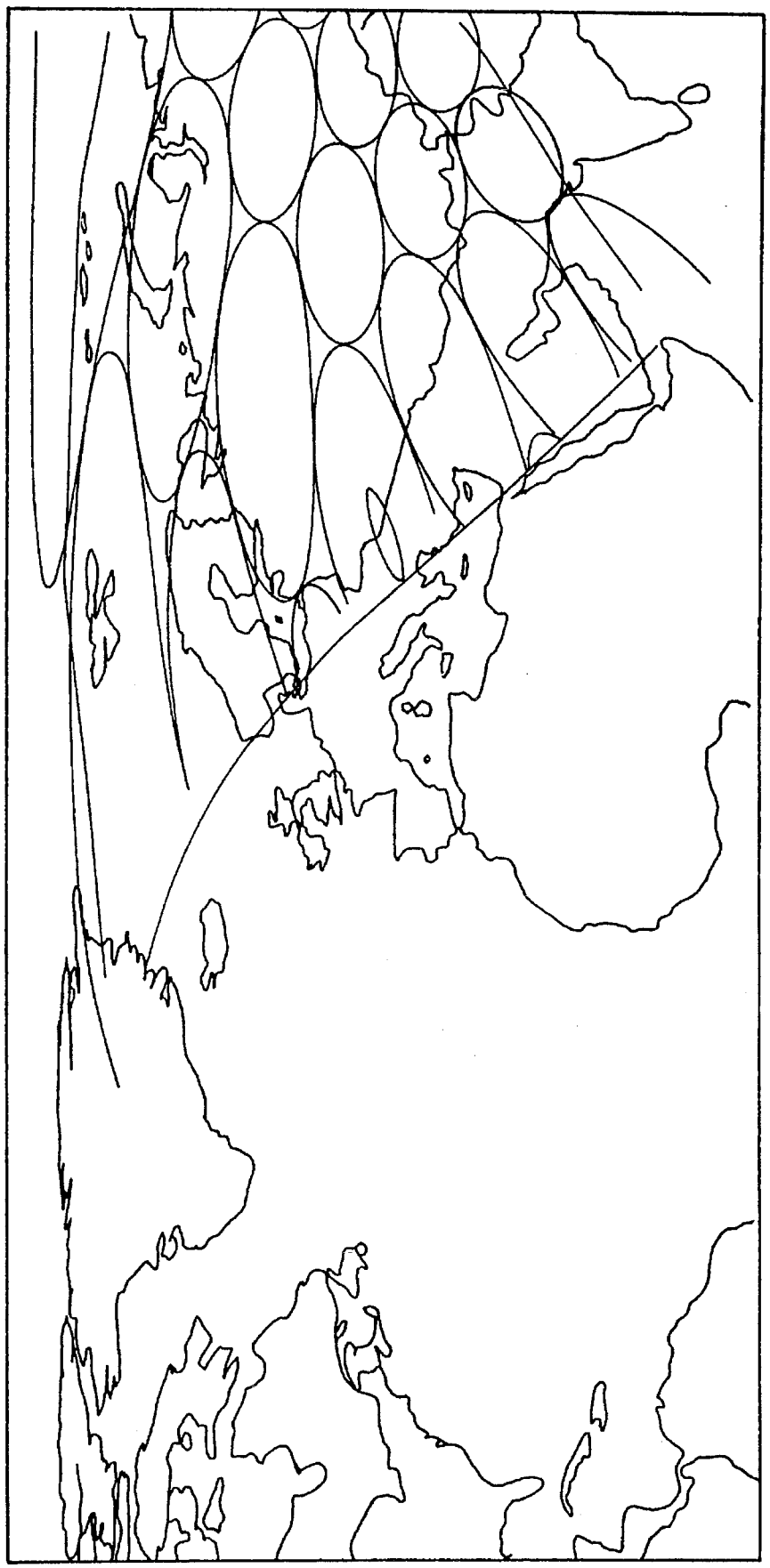

FIG. 12B illustrates the satellite coverage provided by the original constellation at a time period which is fifteen minutes later than that shown for FIG. 12A. The remaining set of figures in the FIG. 12A–12E sequence also illustrate the original satellite constellation at consecutive fifteen minute intervals. In light of the approximately six hour orbital period for the satellites 1–6, these satellites will move around the earth at a generally fixed rate of travel. As a result, it should be appreciated that the coordinated boresight steering method according to the present invention will minimize, if not eliminate, any coverage gaps over land above the minimum elevation angle of 10°. The boresight steering method is referred to as being coordinated in that the adjustment of the boresight angle for one satellite will at many times require a change in the boresight angle of an adjacent satellite. Thus, for example, a change in the boresight angle of satellite 2 may require a change in the boresight angle for both satellites 1 and 3.

The method of boresight steering is dramatically illustrated in the sequence of FIGS. 13A–13G. In this case, a 35° FOV for the satellite antennas is used to more fully illustrate the concept relative to a single satellite 60. More specifically, FIGS. 13A–13G show the beam pattern of satellite 60 as it travels over Europe during a time period of two hours. Each of the circles, such as circles 62 and 64, represent the coverage provided by one beam of a multibeam antenna, such as antenna 16 of FIG. 1. Line 66 represents the minimum elevation angle of 10°. Line 68 represents the boresight line of sight to the ground. Accordingly, in FIG. 13A, the boresight points forward as the satellite 60 approaches Europe, and the boresight angle relative to NADIR decreases in FIGS. 13B–13C, until the boresight aim point is approximately at NADIR in FIG. 13D. Then, as the satellite continues its travel, the boresight is steered to a location looking behind the satellite in FIGS. 13E–13G. It should also be noted that each of the beams are labeled in FIG. 13D to illustrate that the antenna includes an array of 35 beams.

In accordance with the present invention, the physical boresight steering may be accomplished through a variety of mechanisms, such as adjusting the attitude of the satellite itself ("body steering"), the use of gimballed antennas, or possibly even through electronic focusing (e.g., with a phase array antenna). However, in accordance with the coordinated boresight steering method of the present invention, each of the satellites 1–6 (or satellites 40a–40b, 42a–42b and 44a–44b of FIG. 6) would be programmed from a terrestrial-based station with the command signals or other data necessary to control the boresight steering mechanism for a predetermined orbital period. This predetermined orbital period should comprise a significant orbital duration, which will avoid unnecessary ground to satellite transmissions. Thus, for example, the predetermined period may be the repeating 24-hour orbital period which occurs with a satellite altitude of 5600 nautical miles.

As an example of one coordinated boresight steering method according to the present invention, computer generated plots such as those shown in FIGS. 12A–12E are used to determine the most appropriate boresight locations of all of the satellites at various intervals during the predetermined orbital period. While these boresight aim points may be determined manually, it should be appreciated that this process could be automated with an appropriate rule set. In this regard, the Antenna Beam Aim Table ("ABATB") below set forth the boresight locations for each of the six satellites of the original constellation over a six hour period. The first portion of the table identifies the configuration of the satellite constellation. More specifically, a 6/3/3 phasing relationship is used in this example, meaning that there are six satellites in three orbital planes with a 3×60 degree phasing relationship between satellites in different orbital planes. The column labeled Time indicates a point in minutes from the starting time reference. The second column shows the Latitude at this given time, while the third column shows the Longitude at this given time.

Antenna Beam Aim Table

Satellite Configuration *********************,
OESC(1,1) = 54468822.,0.00001,55., 0., 0., 0.,
OESC(1,2) = 54468822.,0.00001,55.,240., 0.,180.,
OESC(1,3) = 54468822.,0.00001,55.,120., 0., 0.,
OESC(1,4) = 54468822.,0.00001,55., 0., 0.,180.,
OESC(1,5) = 54468822.,0.00001,55.,240., 0., 0.,
OESC(1,6) = 54668822.,0.00001,55.,120., 0.,180.,
Satellite # 1 *******************************,

| | TIME | LAT. | LONG. | |
|---|---|---|---|---|
| ABATB(1, 1,1, 1) = | 0.000, | 8.400, | −3.000, | 2 |
| ABATB(1, 2,1, 1) = | 45.000, | 35.400, | 24.000, | 2 |
| ABATB(1, 3,1, 1) = | 75.000, | 48.600, | 47.400, | 2 |
| ABATB(1, 4,1, 1) = | 98.000, | 53.400, | 72.000, | 2 |
| ABATB(1, 5,1, 1) = | 110.000, | 49.200, | 91.800, | 2 |
| ABATB(1, 6,1, 1) = | 120.000, | 43.800, | 100.200, | 2 |
| ABATB(1, 7,1, 1) = | 140.000, | 25.800, | 115.200, | 2 |
| ABATB(1, 8,1, 1) = | 160.000, | 16.800, | 123.000, | 2 |
| ABATB(1, 9,1, 1) = | 180.000, | 2.400, | 130.800, | 1 |
| ABATB(1,10,1, 1) = | 200.000, | −20.000, | 140.000, | 1 |
| ABATB(1,11,1, 1) = | 280.000, | −30.000, | −60.000, | 2 |
| ABATB(1,12,1, 1) = | 290.000, | −43.000, | −107.400, | 2 |
| ABATB(1,13,1, 1) = | 330.000, | −11.400, | −91.800, | 2 |
| ABATB(1,14,1, 1) = | 340.000, | −5.400, | −88.800, | 2 |
| ABATB(1,15,1, 1) = | 350.000, | 3.000, | −84.000, | 2 |
| ABATB(1,16,1, 1) = | 360.000, | 11.400, | −82.800, | 2 |

Satellite # 2 *******************************,

| ABATB(1, 1,1, 2) = | 0.000, | 6.600, | 58.800, | 2 |
|---|---|---|---|---|
| ABATB(1, 2,1, 2) = | 25.000, | −16.800, | 75.600, | 2 |
| ABATB(1, 3,1, 2) = | 90.000, | −20.00, | 140.000, | 1 |
| ABATB(1, 4,1, 2) = | 180.000, | 34.800, | −115.000, | 2 |
| ABATB(1, 5,1, 2) = | 240.000, | 42.000, | −121.200, | 2 |
| ABATB(1, 6,1, 2) = | 260.000, | 46.200, | −112.200, | 2 |
| ABATB(1, 7,1, 2) = | 270.000, | 46.800, | −100.800, | 2 |
| ABATB(1, 8,1, 2) = | 280.000, | 45.600, | −87.000, | 2 |
| ABATB(1, 9,1, 2) = | 290.000, | 41.400, | −72.600, | 2 |
| ABATB(1,10,1, 2) = | 300.000, | 40.200, | −63.600, | 2 |
| ABATB(1,11,1, 2) = | 310.000, | 33.000, | −61.800, | 2 |
| ABATB(1,12,1, 2) = | 320.000, | 34.200, | −45.600, | 2 |
| ABATB(1,13,1, 2) = | 330.000, | 29.400, | −39.600, | 2 |
| ABATB(1,14,1, 2) = | 340.000, | 30.600, | −34.800, | 2 |
| ABATB(1,15,1, 2) = | 350.000, | 11.400, | −23.400, | 2 |
| ABATB(1,16,1, 2) = | 360.000, | −11.400, | −34.200, | 2 |

Satellite # 3 *******************************,

| ABATB(1, 1,1, 3) = | 0.000, | 4.800, | 118.800, | 2 |
|---|---|---|---|---|
| ABATB(1, 2,1, 3) = | 45.000, | 34.200, | 133.800, | 2 |
| ABATB(1, 3,1, 3) = | 70.000, | 46.200, | 155.400, | 1 |
| ABATB(1, 4,1, 3) = | 96.000, | 51.600, | −145.200, | 2 |
| ABATB(1, 5,1, 3) = | 110.000, | 46.200, | −126.600, | 2 |
| ABATB(1, 6,1, 3) = | 120.000, | 44.400, | −121.200, | 2 |
| ABATB(1, 7,1, 3) = | 140.000, | 33.600, | −115.200, | 2 |
| ABATB(1, 8,1, 3) = | 160.000, | 27.000, | −106.200, | 2 |
| ABATB(1, 9,1, 3) = | 180.000, | 12.600, | −91.200, | 2 |
| ABATB(1,10,1, 3) = | 210.000, | −14.400, | −67.800, | 2 |
| ABATB(1,11,1, 3) = | 240.000, | −25.200, | −60.600, | 2 |
| ABATB(1,12,1, 3) = | 270.000, | −37.200, | −31.800, | 2 |
| ABATB(1,13,1, 3) = | 280.000, | −36.600, | −20.400, | 2 |
| ABATB(1,14,1, 3) = | 290.000, | −38.400, | −7.200, | 2 |
| ABATB(1,15,1, 3) = | 300.000, | −33.600, | 1.200, | 2 |
| ABATB(1,16,1, 3) = | 330.000, | −12.000, | 28.800, | 2 |
| ABATB(1,17,1, 3) = | 340.000, | −1.200, | 23.400, | 2 |
| ABATB(1,18,1, 3) = | 350.000, | 4.200, | 28.200, | 2 |
| ABATB(1,19,1, 3) = | 360.000, | 10.200, | 30.000, | 2 |

Satellite # 4 *******************************,

| ABATB(1, 1,1, 4) = | 0.000, | −30.000, | 140.000, | 1 |
|---|---|---|---|---|
| ABATB(1, 2,1, 4) = | 50.000, | −30.000, | −60.000, | 2 |
| ABATB(1, 3,1, 4) = | 180.000, | 0.600, | −50.400, | 2 |
| ABATB(1, 4,1, 4) = | 210.000, | 29.400, | −31.800, | 2 |
| ABATB(1, 5,1, 4) = | 220.000, | 32.400, | −28.800, | 2 |
| ABATB(1, 6,1, 4) = | 230.000, | 37.800, | −10.800, | 2 |
| ABATB(1, 7,1, 4) = | 240.000, | 43.800, | 1.200, | 2 |
| ABATB(1, 8,1, 4) = | 270.000, | 38.400, | 32.400, | 2 |
| ABATB(1, 9,1, 4) = | 280.000, | 41.400, | 40.800, | 2 |
| ABATB(1,10,1, 4) = | 290.000, | 40.800, | 48.000, | 2 |
| ABATB(1,11,1, 4) = | 300.000, | 40.200, | 57.600, | 2 |
| ABATB(1,12,1, 4) = | 330.000, | 29.400, | 82.200, | 2 |
| ABATB(1,13,1, 4) = | 350.000, | 15.600, | 84.600, | 2 |
| ABATB(1,14,1, 4) = | 360.000, | 12.600, | 100.200, | 2 |

Satellite # 5 *******************************

| ABATB(1, 1,1, 5) = | 0.000, | 4.800, | −116.400, | 2 |
|---|---|---|---|---|
| ABATB(1, 2,1, 5) = | 60.000, | 42.600, | −87.600, | 2 |
| ABATB(1, 3,1, 5) = | 98.000, | 49.800, | −49.200, | 2 |
| ABATB(1, 4,1, 5) = | 110.000, | 44.400, | −25.800, | 2 |
| ABATB(1, 5,1, 5) = | 120.000, | 43.200, | −12.000, | 2 |
| ABATB(1, 6,1, 5) = | 140.000, | 32.400, | 6.600, | 2 |
| ABATB(1, 7,1, 5) = | 160.000, | 21.000, | 15.600, | 2 |
| ABATB(1, 8,1, 5) = | 180.000, | 5.400, | 17.400, | 2 |
| ABATB(1, 9,1, 5) = | 250.000, | −15.000, | 30.600, | 1 |
| ABATB(1,10,1, 5) = | 252.000, | −20.000, | 140.000, | 1 |
| ABATB(1,11,1, 5) = | 270.000, | −46.200, | 97.200, | 2 |
| ABATB(1,12,1, 5) = | 290.000, | −41.400, | 121.800, | 2 |

-continued

| Antenna Beam Aim Table | | | |
|---|---|---|---|
| ABATB(1,13,1, 5) = | 300.000, | −33.000, | 127.800, 2 |
| ABATB(1,14,1, 5) = | 310.000, | −24.600, | 129.600, 2 |
| ABATB(1,15,1, 5) = | 320.000, | −21.000, | 138.000, 2 |
| ABATB(1,16,1, 5) = | 330.000, | −8.400, | 135.000, 2 |
| ABATB(1,17,1, 5) = | 340.000, | −2.400, | 144.600, 2 |
| ABATB(1,18,1, 5) = | 350.000, | −1.200, | 141.000, 2 |
| ABATB(1,19,1, 5) = | 360.000, | 2.400, | 141.600, 2 |
| Satellite # 6 ******************************, | | | |
| ABATB(1, 1,1, 6) = | 0.000, | 3.000, | −61.800, 2 |
| ABATB(1, 2,1, 6) = | 40.000, | −27.000, | −44.400, 1 |
| ABATB(1, 3,1, 6) = | 120.000, | −11.400, | 103.800, 2 |
| ABATB(1, 4,1, 6) = | 180.000, | 2.400, | 82.800, 2 |
| ABATB(1, 5,1, 6) = | 210.000, | 28.200, | 73.800, 2 |
| ABATB(1, 6,1, 6) = | 226.000, | 34.800, | 93.600, 2 |
| ABATB(1, 7,1, 6) = | 240.000, | 38.400, | 105.000, 2 |
| ABATB(1, 8,1, 6) = | 270.000, | 36.000, | 129.600, 2 |
| ABATB(1, 9,1, 6) = | 280.000, | 48.000, | 153.600, 2 |
| ABATB(1,10,1, 6) = | 290.000, | 46.200, | 168.600, 2 |
| ABATB(1,11,1, 6) = | 300.000, | 38.400, | 171.600, 2 |
| ABATB(1,12,1, 6) = | 302.000, | 35.400, | 170.400, 1 |
| ABATB(1,13,1, 6) = | 310.000, | 31.200, | −166.800, 2 |
| ABATB(1,14,1, 6) = | 320.000, | 32.400, | −162.600, 2 |
| ABATB(1,15,1, 6) = | 330.000, | 27.600, | −151.200, 2 |
| ABATB(1,16,1, 6) = | 340.000, | 24.000, | −142.200, 2 |
| ABATB(1,17,1, 6) = | 360.000, | 8.400, | −139.800, 2 |

Thus, for example, at Time=120 minutes, the antennas 16–18 of the first satellite will be pointed at Latitude 43.8° and Longitude 100.2°, while the antennas of the third satellite will be pointed at Latitude 44.4° and Longitude −121.2°. In contrast, it will be noted that there is no time entry in the table for the second satellite at Time=120 minutes. Rather, the closest time entries for the second satellite are for Time=90 minutes and Time=180 minutes, respectively. This is not to say that the boresight of the second satellite remains fixed during this 90 minute interval between Time=90 minutes and Time=180 minutes. In accordance with one method step under the present invention, the boresight location may be interpolated between each time entry in the table, such as through straight line approximation between two points (as indicated by the last column of the table). The difference between each of the time entries in the table is related to the speed at which the boresight angle needs to be adjusted. Thus, for example, in several instances of the table, the time difference may only be 10 minutes when rapid movement is necessary to maintain continuous 24-hour coverage. In other words, it should be understood that the antenna boresight of the satellites will be steered at a variable rate in accordance with the present invention. For example, when a satellite is arriving or leaving a particular region of the earth, such as Europe, the rate at which the boresight angle is changed will be greater than the rate of change required when the satellite is more directly over its current region of coverage. In any event, it should be understood that the present invention may be utilized with a variety of different satellite attitude control systems. Thus, while boresight locations over time could be uplinked to each of the satellites, it should also be understood that other command information could be supplied as well, such as steering rate commands relative to time.

Figure 14:
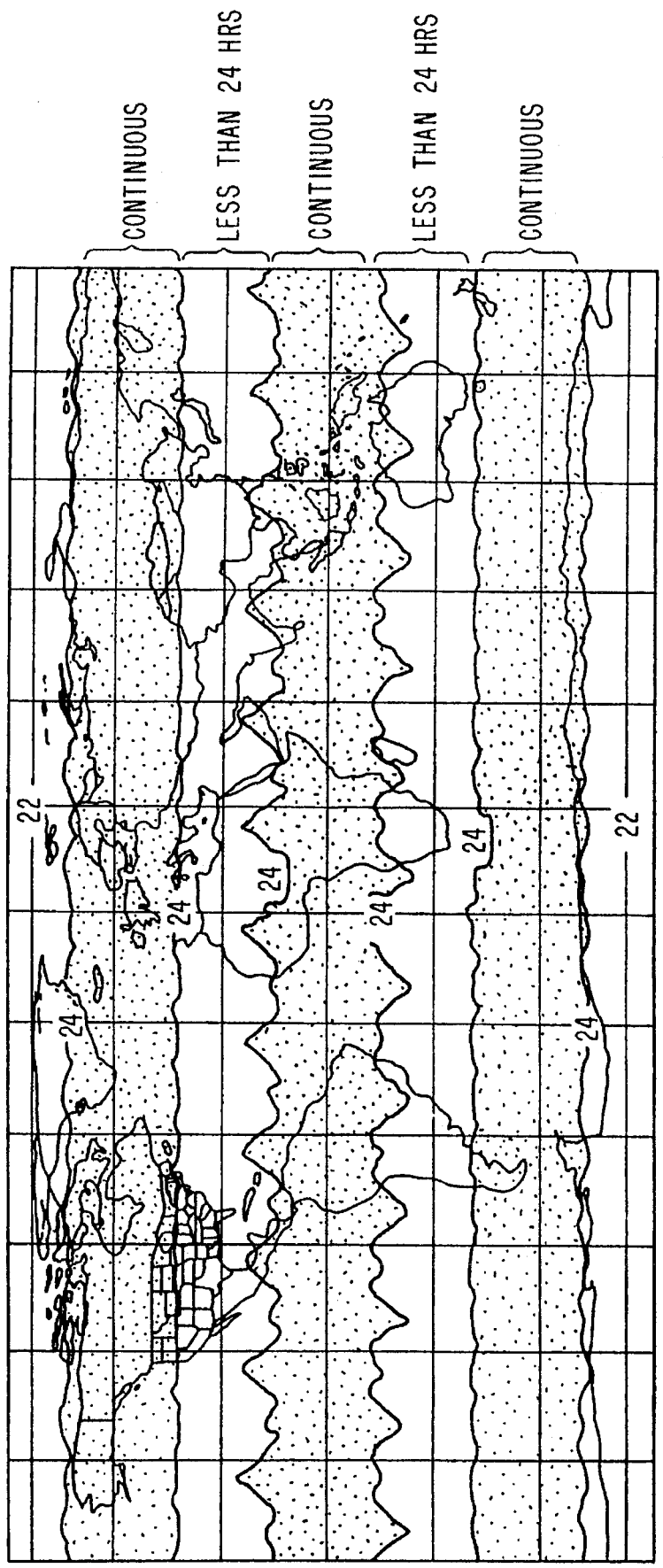
FIG. 14 is a cartographic illustration of satellite visibility using an alternate constellation wherein each of the satellites reside in their own individual orbital planes.
Figure 15:
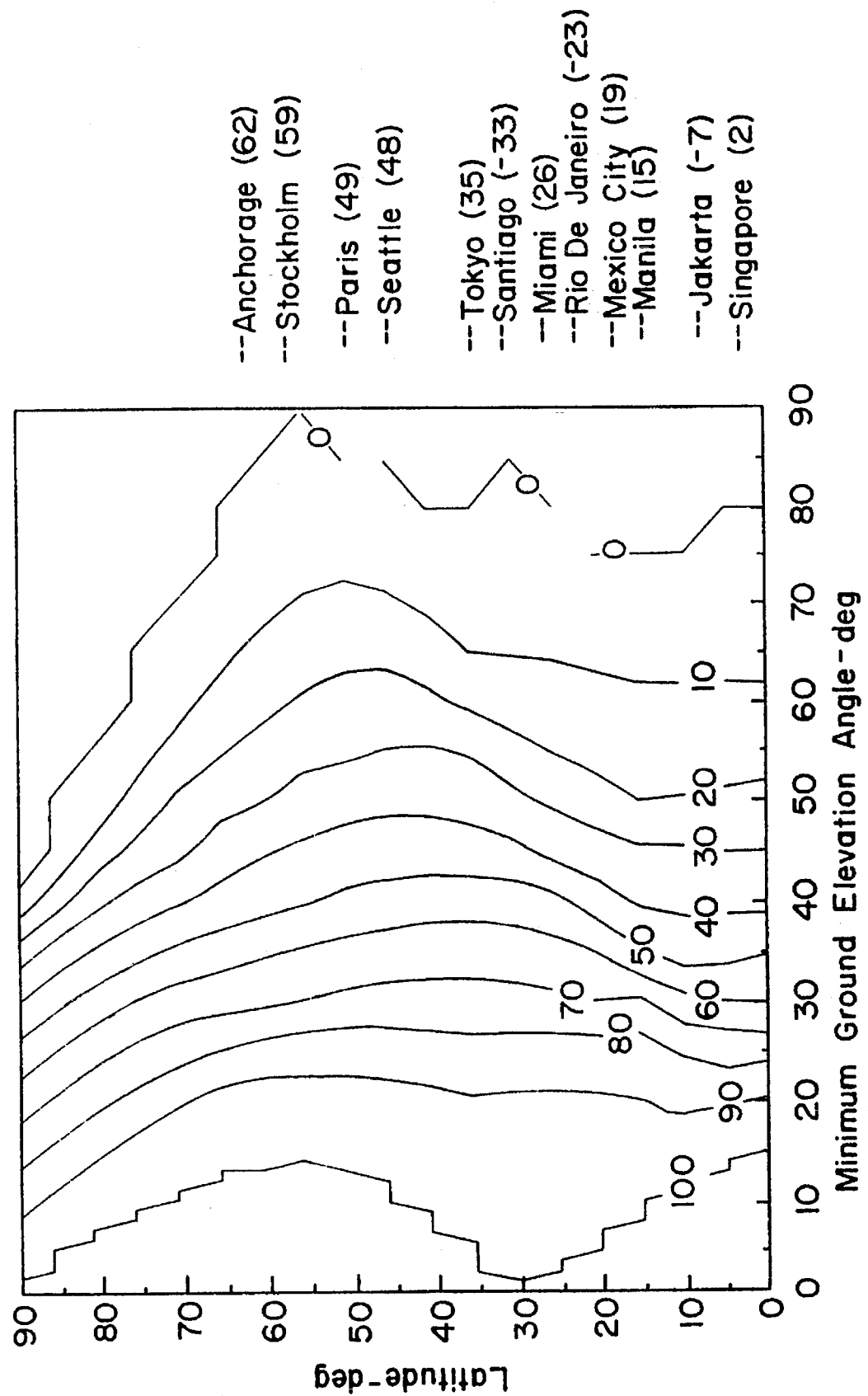
FIG. 15 is a graphical illustration of satellite coverage using the original constellation referred to in FIG. 14.
Figure 16:
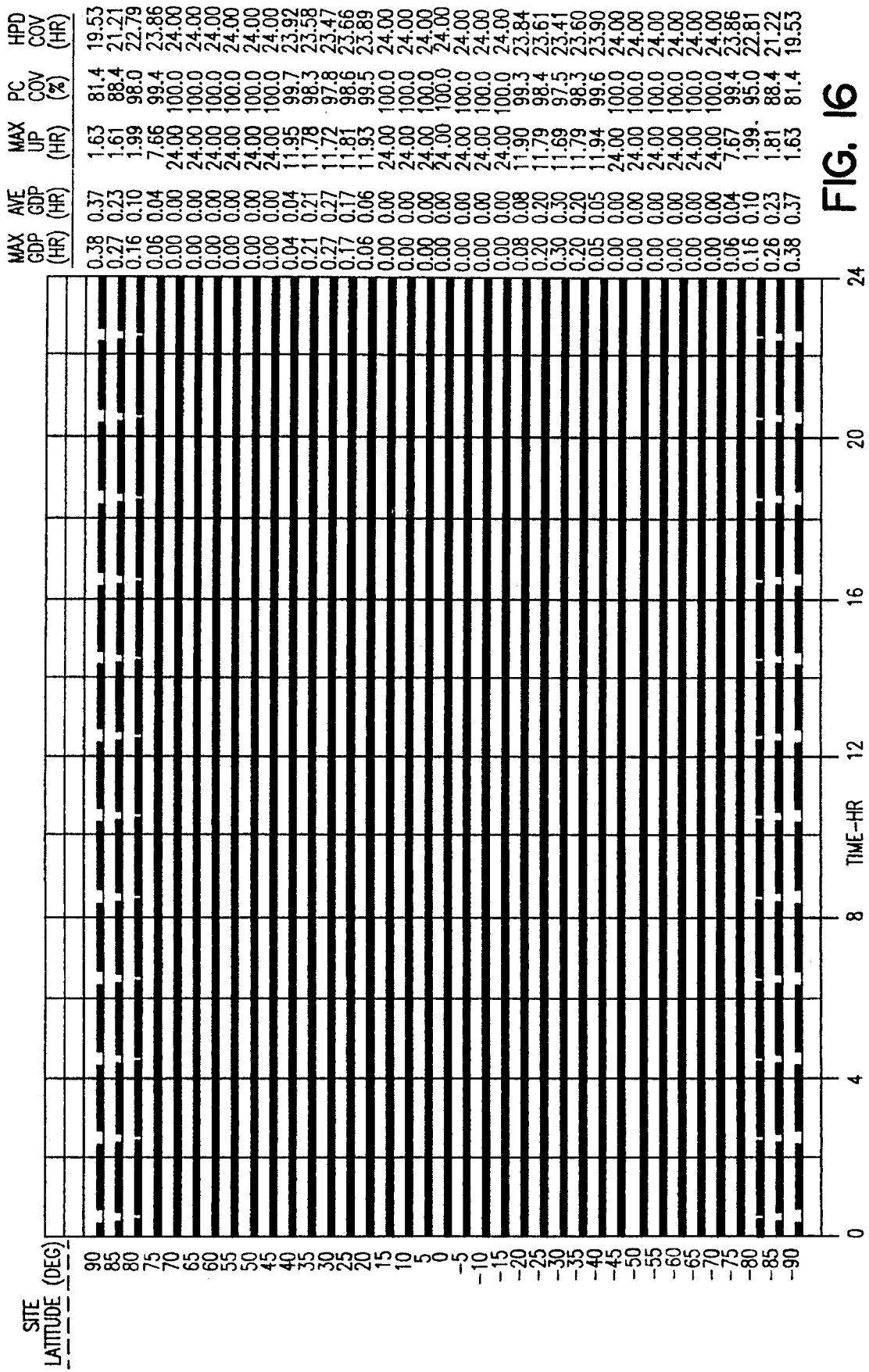
FIG. 16 is another graphical illustration of satellite coverage using the original constellation referred to in FIG. 14.

Referring to FIGS. 14–16, these figures will be used to illustrate an alternative original constellation embodiment. The principal distinction between this original constellation embodiment and that of FIG. 6 is that each of the six satellites 40a–40b, 42a–42b and 44a–44b will reside in their own individual orbital planes, each of which are inclined at a preferably 53° angle relative to the equator (e.g., plane $P_7$). Accordingly, the preferred phasing for this alternative embodiment will be 6/6/4. FIGS. 14–16 generally correspond to FIGS. 9–11 in order to more fully illustrate and contrast this embodiment with the previous original constellation embodiment. In this regard, FIG. 14 shows that the band of continuous satellite visibility has affectively shifted upwardly, so that now all but the most southern portion of Europe is visible. In other words, the original constellation of FIGS. 6 and 9–11 is directed towards initial coverage of the United States, while the alternative constellation of FIGS. 14–16 is directed towards initial coverage of Europe. Nevertheless, FIG. 16 demonstrates that only two relatively minor gaps in coverage would result for telecommunications with users located in the United States. In either case, the preferred altitude of the satellite constellation is still 5600 nautical miles.

Figure 17:
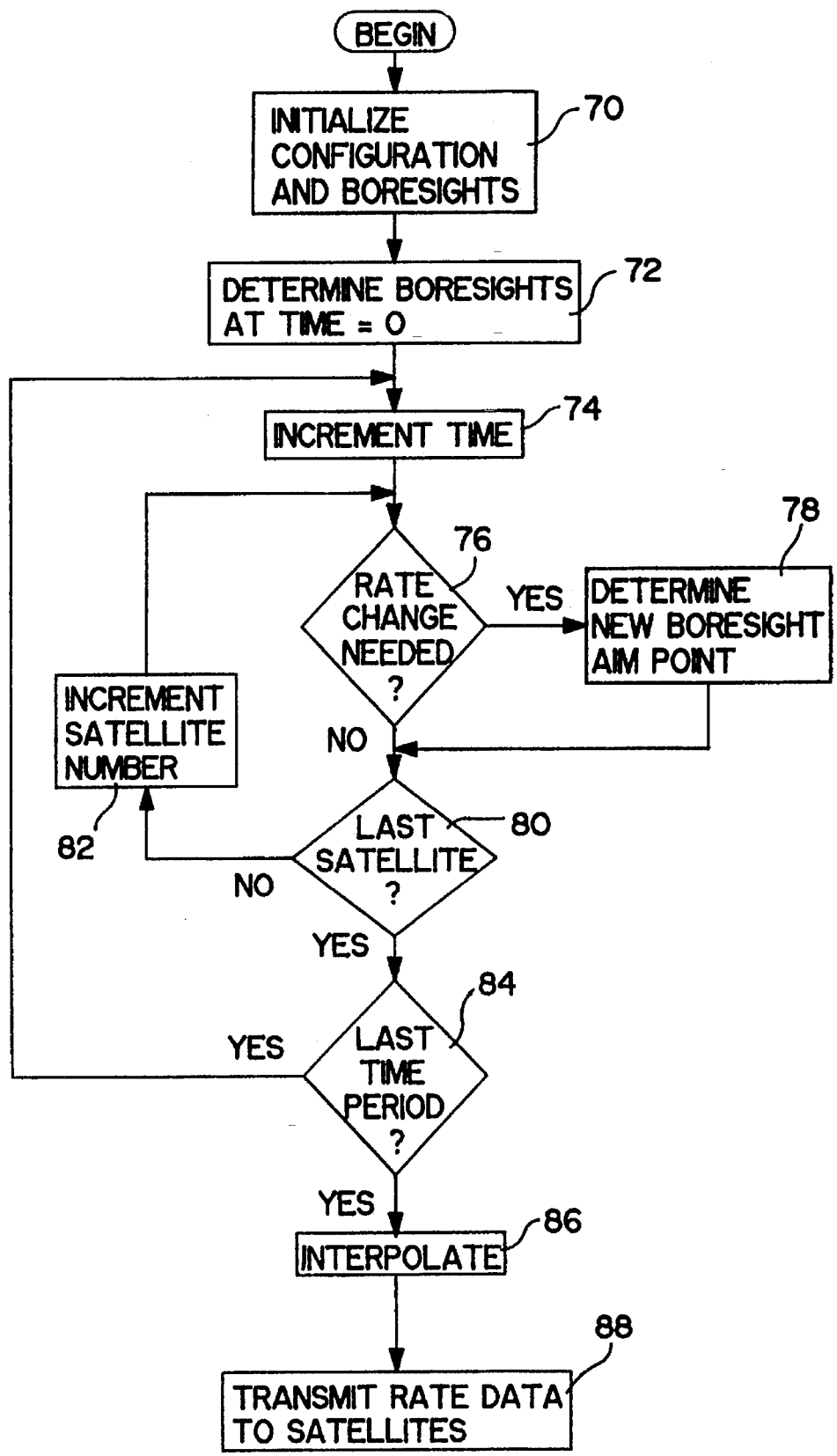
FIG. 17 is a flow chart which further illustrates the coordinated boresight steering method according to the present invention.

Finally, FIG. 17 provides a flow chart which illustrates one technique for implementing the coordinated boresight steering method according to the present invention. The first step will be to initialize the satellite configuration (block 70), as indicated in the Antenna Beam Aim Table discussed above. The boresight for each of the satellites may be initially set to a predetermined orientation, such as NADIR. The next step will be to determine the most appropriate boresights for each of the satellites at Time=0 (block 72). A chart such as that shown in FIG. 12A could be used to guide this determination. However, it should be understood that this process may be further automated with appropriate programming.

Once the boresights at Time=0 are determined, then the time period should be incremented by a predeterminable amount to consider whether a change in the boresight steering rate is needed for the first satellite (block 74). For example, a minimum time period of five minutes could be used. However, it should be appreciated that other suitable time periods could be selected, depending in part upon the altitude of the satellites and the speed at which they are orbiting the earth. Accordingly, at Time=5 minutes a decision should be made as to whether the boresight steering rate should be changed for the first satellite (diamond 76). In the event that a steering rate changed is required, then a new boresight aim point will be determined (block 78). This new boresight aim point may be stored as an entry in the Antenna Beam Aim Table, as discussed above. If a rate change is not required in order to maintain the desired coverage, then this determination should be made for each of the other satellites in turn before another time increment is considered. Accordingly, FIG. 17 illustrates a check to see if the current satellite being considered is the last satellite in the constellation (diamond 80). If the current satellite is not the last satellite, then the next satellite in the constellation will be examined (block 82).

Once all of the satellites in the constellation have been examined for coverage at the current time increment, a check will be made to see if this time increment is the last time increment in the predetermined time period over which rate adjustments will be considered (diamond 84). If the current time increment is not the last time period, then the time period will be incremented and the process will be repeated. Once the complete time or orbital period has been evaluated, then an interpolate step may be performed to convert the sequence of boresight aim points in the table to rate commands (block 86). Finally, these rate commands or other suitable data for adjusting the boresight will be transmitted to each of the satellites in the constellation (block 88). These rate commands may be transmitted from one or more ground-based control stations, such as gateway station 12 shown in FIG. 1. For example, the rate commands could be uplinked from one ground-based control station as each satellite passes in turn over the region of coverage in which the ground-based control station is located. However, in the event that not all of the satellites in the constellation cover the region where the ground-based station is located, then an additional ground-based station may be employed to transmit the rate commands to pre-selected satellites.

From the foregoing, it will be appreciated that the present invention represents a significant advance in the field of satellite-based cellular telecommunications systems. Although several preferred embodiments of the invention have been shown and described, it will be apparent that other adaptations and modifications can be made without departing from the spirit and scope of the invention. Accordingly, the invention is not to be limited, except as by the following claims.

What is claimed is:

1. A constellation of telecommunication satellites which provides 24-hour cellular telephone communication coverage over a predetermined latitude range around the world for a cellular transceiver having an omni-directional antenna operating at a power level as low as ½ watt, comprising:

a plurality of less than 9 telecommunication satellites providing 24-hour cellular telephone communication coverage over a predetermined latitude range around the world which is less than whole earth coverage, each of said satellites having a plurality of multibeam antennas for enabling simultaneous bi-directional communication links with a plurality of cellular-based telecommunication devices;

each of said satellites residing in one of a plurality of predetermined orbits, with the number of said predetermined orbits being different than the number of said satellites in each of said predetermined orbits; and each of said predetermined orbits being related to the other orbits such that each of said predetermined orbits has a predetermined inclination angle with respect to the equator, a predetermined altitude of between approximately 5600 nmi and 7500 nmi, and a predetermined ascending node spacing between satellites in different orbital planes.

2. The constellation of telecommunication satellites according to claim 1, wherein there are a plurality of said satellites in each of said predetermined orbits.

3. The constellation of telecommunication satellites according to claim 2, wherein said satellites reside in three orbital planes and there are two satellites in each of said orbital planes.

4. The constellation of telecommunication satellites according to claim 1 wherein said predetermined inclination angle is between 50 and 55 degrees with respect to the equator.

5. The constellation of telecommunication satellites according to claim 1, wherein said predetermined altitude is approximately 5600 nautical miles above the earth.

6. A constellation of telecommunication satellites which provides 24-hour cellular telephone communication coverage over a predetermined latitude range around the world for a cellular transceiver having an omni-directional antenna operating at a power level as low as ½ watt, comprising:

a plurality of telecommunication satellites, each of said satellites having a plurality of multibeam antennas for enabling simultaneous bi-directional communication links with a plurality of cellular-based telecommunication devices;

each of said satellites residing in one of a plurality of predetermined orbits, with the number of said satellites in each of said orbits being different than the number of said orbits to provide 24-hour cellular telephone communication coverage over a predetermined latitude range around the world which is less than whole earth coverage; and each of said predetermined orbits being related to the other orbits such that each of said predetermined orbits has a predetermined inclination angle with respect to the equator, a predetermined altitude of between approximately 5600 nmi and 7500 nmi, a predetermined ascending node spacing between satellites in different orbital planes, and a predetermined relative phase angle between satellites in different orbital planes such that an arriving satellite comes into view above a predetermined minimum elevation angle before a departing satellite disappears from view.

7. The constellation of telecommunication satellites according to claim 6, wherein there are a plurality of said satellites in each of said predetermined orbits.

8. The constellation of telecommunication satellites according to claim 7, wherein said satellites reside in three orbital planes and there are two satellites in each of said orbital planes.

9. The constellation of telecommunication satellites according to claim 6, wherein said predetermined inclination angle is between 50 and 55 degrees with respect to the equator.

10. The constellation of telecommunication satellites according to claim 6, wherein said predetermined altitude is approximately 5600 nautical miles above the earth.

11. A cellular telephone communication system having at least one planetary-based gateway station, a plurality of telecommunication satellites having a plurality of multibeam cellular communication antennas and at least one land-based mobile telecommunication device which is randomly located in a fixed cellular service region, said cellular telephone communication system being characterized by:

each antenna providing a predetermined field of view which is less than the field of view for any of said satellites limiting a maximum swing of the boresight angle of said antenna to approximately ±4° relative to NADIR for communication coverage with said land-based mobile telecommunication device to achieve 24-hour cellular telephone communication coverage over a predetermined latitude range around the world which is less than whole world coverage, and an orbital configuration of said satellites in which each of said satellites resides in one of a plurality of predetermined altitude orbits of between approximately 5600 nmi and 7500 nmi, each of said predetermined orbits being related to the other orbits such that each of said predetermined orbits has a predetermined inclination angle with respect to the equator, a predetermined ascending node spacing between satellites in different orbital planes and a predetermined relative phase angle between satellites in different orbital planes.

12. A cellular telephone communication system having at least one planetary-based gateway station, a plurality of telecommunication satellites having a plurality of multibeam cellular communication antennas and at least one land-based mobile telecommunication device which is randomly located in a fixed cellular service region, said cellular telephone communication system being characterized by:

each antenna providing a predetermined field of view which is less than the field of view for any of said satellites, and an orbital configuration of said satellites in which each of said satellites resides in one of a plurality of predetermined altitude orbits of between approximately 5600 nmi and 7500 nmi, with the number of said satellites in each of said orbits being different than the number of said orbits, each of said predetermined orbits being related to the other orbits such that each of said predetermined orbits has a predetermined inclination angle with respect to the equator, a predetermined ascending node spacing between satellites in different orbital planes, and a predetermined relative phase angle between satellites in different orbital planes;

the number of said satellites, the field of view of said satellites and said orbital configuration combining to provide 24-hour cellular telephone communication coverage over a predetermined latitude range around the world which is less than whole earth coverage.

13. A cellular telecommunications system, comprising:

at least one mobile cellular telephone station having an omnidirectional antenna, said mobile cellular telephone station including means for transceiving radio frequency energy (RF);

at least one additional mobile or fixed telephone station being spaced from said mobile cellular telephone station within a predetermined region of the earth, with the fixed telephone station being connected to a gateway station including an antenna for transceiving radio frequency energy (RF);

a satellite constellation located in space over the earth and including apparatus for transceiving radio frequency energy (RF) for providing a radio frequency energy communication link with said mobile cellular telephone station and said additional mobile or gateway station, said satellite constellation comprising:

a plurality of telecommunications satellites, said plurality of telecommunications satellites being spaced and moving in a plurality of orbits about the earth with the movement of said satellites being non-synchronous to the rotation of the earth, said plurality of orbits being circular;

all of said plurality of telecommunications satellites being at an altitude between approximately 5600 nmi and 7500 nmi above the earth; and at least one of said telecommunications satellites being in the line of sight to both said mobile cellular telephone station and said additional mobile or gateway station at any instant of time, with said line of sight being at a minimum elevation angle of no less than 10°;

wherein a radio frequency energy (RF) propagation time between said mobile cellular telephone station or said additional mobile or gateway station to said telecommunications satellite is less than 60 msec; and wherein said telecommunications satellites have receiving antennas permitting reception at said altitude of signals emitted from said mobile cellular telephone station having an omni-directional antenna.

14. The cellular telecommunications system according to claim 13, wherein said orbits are substantially equally inclined at a predetermined angle relative to the equatorial plane of the earth.

15. The cellular telecommunications system according to claim 14, wherein an inclination angle of said orbits is 55°.

16. The cellular telecommunications system according to claim 13, wherein said orbits are evenly spaced about the equator of the earth.

17. The cellular telecommunications system according to claim 13, wherein the mobile cellular telephone station transmits radio frequency signals with power levels as low as one half watt.

18. The cellular telecommunications system according to claim 13, wherein said telecommunications satellites within one orbit are evenly spaced from one another.

19. The cellular telecommunications system according to claim 13, wherein the number of said plurality of orbits is three, the number of said plurality of telecommunications satellites per orbit is three and wherein said three satellites are equally spaced in their orbit so as to insure that any telephone station is always within view of at least one satellite.

20. The cellular telecommunications system according to claim 13, wherein the number of telecommunications satellites per orbit is four; and wherein said four satellites are equally spaced in their orbit to insure that any telephone station is always in view of at least two satellites.

21. A cellular telecommunications system, comprising:

at least one mobile cellular telephone station, said mobile cellular telephone station having an omni-directional antenna and including means for transceiving radio frequency energy (RF);

at least one additional mobile or fixed telephone station being spaced from said mobile cellular telephone station within a predetermined region of the earth, with the fixed telephone station being connected to a gateway station including an antenna for transceiving radio frequency energy (RF);

a satellite constellation located in space over the earth and including apparatus for transceiving radio frequency energy (RF) for providing a radio frequency energy communication link with said mobile cellular telephone station and said additional mobile or gateway station, said satellite constellation comprising:

a plurality of telecommunications satellites, said plurality of telecommunications satellites being spaced and moving in a plurality of orbits about the earth with the movement of said satellites being non-synchronous to the rotation of the earth, said plurality of orbits being circular;

all of said plurality of telecommunications satellites being at an altitude between approximately 5600 nmi and 7500 nmi above the earth;

at least one of said telecommunications satellites being in the line of sight to both said mobile cellular telephone station and said additional mobile or gateway station at any instant of time, with said line of sight being at a minimum elevation angle of no less than 10°;

wherein a radio frequency energy (RF) propagation time between said mobile cellular telephone station or said additional mobile or gateway station to said telecommunications satellite is less than 60 msec;

wherein said telecommunications satellites have receiving antennas permitting reception at said altitude of signals emitted from said mobile cellular telephone station having an omni-directional antenna; and wherein the number of orbits and the number of telecommunications satellites per orbit and the spacing of said satellites is sufficient to insure that said mobile cellular telephone station is always within view of at least two satellites.

22. A cellular telecommunications system, comprising:

at least one mobile cellular telephone station, said mobile cellular telephone station having an omni-directional antenna and including means for transceiving radio frequency energy (RF);

at least one additional mobile or fixed telephone station being spaced from said mobile cellular telephone station within a predetermined region of the earth, with the fixed telephone station being connected to a gateway station including an antenna for transceiving radio frequency energy (RF);

a satellite constellation located in space over the earth and including apparatus for transceiving radio frequency energy (RF) for providing a radio frequency energy communication link with said mobile cellular telephone station and said additional mobile or gateway station, said satellite constellation comprising:

a plurality of telecommunications satellites, said plurality of telecommunications satellites being spaced and moving in a plurality of orbits about the earth with the movement of said satellites being non-synchronous to the rotation of the earth, said plurality of orbits being circular;

all of said plurality of telecommunications satellites being at an altitude between approximately 5600 nmi and 7500 nmi above the earth; and at least one of said telecommunications satellites being in the line of sight to both said mobile cellular telephone station and said additional mobile or fixed telephone station at any instant of time, with said line of sight being at a minimum elevation angle of no less than 10°;

wherein a radio frequency energy (RF) propagation time between said mobile cellular telephone station or said additional mobile or gateway station to said telecommunications satellite is less than 60 msec;

wherein said telecommunications satellites have receiving antennas permitting reception at said altitude of signals emitted from said mobile cellular telephone station having an omni-directional antenna; and wherein a predetermined relative phase separation between said telecommunications satellites in adjacent orbital planes ensures that, before a leaving telecommunications satellites disappears from view above said minimum elevation angle, at least one arriving telecommunications satellites comes into view above said minimum elevation angle.

23. A cellular telecommunications system, comprising:

at least one mobile cellular telephone station, said mobile cellular telephone station having an omni-directional antenna and including means for transceiving radio frequency energy (RF);

at least one additional mobile or fixed telephone station being spaced from said mobile cellular telephone station within a predetermined region of the earth, with the fixed telephone station being connected to a gateway station including an antenna for transceiving radio frequency energy (RF);

a satellite constellation located in space over the earth and including apparatus for transceiving radio frequency energy (RF) for providing a radio frequency energy communication link with said mobile cellular telephone station and said additional mobile or gateway station, said satellite constellation comprising:

a plurality of telecommunications satellites, said plurality of telecommunications satellites being spaced and moving in a plurality of orbits about the earth with the movement of said satellites being non-synchronous to the rotation of the earth, said plurality of orbits being circular and having an altitude of approximately 5600 nmi above the earth; and at least one of said telecommunications satellites being in the line of sight to both said mobile cellular telephone station and said additional mobile or fixed telephone station at any instant of time, with said line of sight being at a minimum elevation angle of no less than 10°;

wherein a radio frequency energy (RF) propagation time between said mobile cellular telephone station or said additional mobile or fixed telephone station to said telecommunications satellite being less than 60 msec; and wherein said telecommunications satellites have receiving antennas permitting reception at said altitude of signals emitted from said mobile cellular telephone station having an omni-directional antenna.

24. A cellular telecommunications system, comprising:

at least one mobile cellular telephone station, said mobile cellular telephone station having an omni-directional antenna and including means for transceiving radio frequency energy (RF);

at least one additional mobile or fixed telephone station being spaced from said mobile cellular telephone station within a predetermined region of the earth, with the fixed telephone station being connected to a gateway station including an antenna for transceiving radio frequency energy (RF);

a satellite constellation located in space over the earth and including apparatus for transceiving radio frequency energy (RF) for providing a radio frequency energy communication link with said mobile cellular telephone station and said additional mobile or fixed telephone station, said satellite constellation comprising:

a plurality of telecommunications satellites, said plurality of telecommunications satellites being spaced and moving in a plurality of orbits about the earth with the movement of said satellites being non-synchronous to the rotation of the earth, said plurality of orbits being circular;

all of said plurality of telecommunications satellites being at an altitude between approximately 5600 nmi and 7500 nmi above the earth; and at least one of said telecommunications satellites being in the line of sight to both said mobile cellular telephone station and said additional mobile or fixed telephone station at any instant of time, with said line of sight being at a minimum elevation angle of no less than 10°;

wherein a radio frequency energy (RF) propagation time between said mobile cellular telephone station or said additional mobile or fixed telephone station to said telecommunications satellite satellites is less than 60 msec;

wherein said telecommunications satellites have receiving antennas permitting reception at said altitude of signals emitted from said mobile cellular telephone station having an omni-directional antenna; and wherein each of said telecommunications satellites includes an antenna capable of transceiving over multiple radio frequency energy beams.

25. A method of providing cellular telecommunications, comprising the steps of:

establishing a satellite constellation having a plurality of telecommunications satellites spaced in a plurality of inclined orbits about the earth with the movement of said satellites being non-synchronous to the rotation of the earth, all of said plurality of telecommunications satellites being at an altitude between approximately 5600 nmi and 7500 nmi above the earth;

providing a plurality of mobile or fixed cellular telephone stations for users on the earth;

initiating a telephonic communications session with a mobile cellular telephone station, said mobile cellular telephone station including means for transceiving radio frequency energy (RF) and an additional mobile or fixed telephone station being spaced from said mobile cellular telephone station within a predetermined region of the earth, with the fixed telephone station being connected to a gateway station including an antenna for transceiving radio frequency energy (RF), by transmitting a radio frequency energy (RF) signal from said mobile cellular telephone station through an omni-directional antenna to be received by one satellite of said constellation of telecommunications satellites for providing an RF communication link between said mobile cellular telephone station and said additional mobile or fixed telephone station;

wherein at least one of said telecommunications satellites is in the line of sight to both said mobile cellular telephone stations and said additional mobile or gateway station at any instant of time, with said line of sight being at a minime elevation angle of no less than 10°; wherein the radio frequency energy (RF) propagation time between said mobile cellular telephone station or said additional mobile or gateway station to said telecommunications satellite is less than 60 msec; and wherein said telecommunications satellites have receiving sensitivity and antennas permitting reception at said altitude of signals emitted from a mobile cellular telephone station having an omni-directional antenna with an RF power level of one half watt; and retransmitting said RF signal through an antenna of said satellite to said additional mobile or gateway station to be received at said additional mobile or gateway station and establishing a communication link between said additional mobile or gateway station and said mobile cellular telephone station.

26. A medium-earth-orbit, satellite-based cellular telecommunications system comprising:

a plurality of mobile cellular telephone stations including at least one transceiver with an omni-directional antenna;

a constellation of telecommunications satellites providing a multibeam radio frequency (rf) communications link for said plurality of cellular telephone stations, the satellites being placed in a plurality of inclined orbits about the earth at an altitude of between approximately 5600 and 7500 nautical miles, wherein at least one satellite includes:

a multibeam antenna having a boresight; and directing means for adjusting said antenna boresight to focus on a predetermined region of the earth as the satellite orbits said predetermined region.

27. The satellite-based cellular telecommunications system as set forth in claim 26, wherein the directing means adjusts the attitude of the satellite to maintain the antenna boresight on the predetermined region.

28. The satellite-based cellular telecommunications system as set forth in claim 26, wherein the directing means gimbals and rotates the antenna to maintain the antenna boresight on the predetermined region.

29. The satellite-based cellular telecommunications system as set forth in claim 26, wherein the orbits are approximately circular.

30. The satellite-based cellular telecommunications system as set forth in claim 26, wherein the constellation includes nine satellites arranged in three circular orbital planes, with three satellites in each orbital plane, the satellites being evenly spaced at 120° intervals in each orbital plane at an altitude of 5600 nautical miles, each orbital plane being inclined at angle of 55° relative to the equatorial plane to insure that each station is within view of at least one of said satellites at all times at a viewing angle to the earth of not less than 10°.

31. The satellite-based cellular telecommunications system as set forth in claim 26, wherein the constellation includes twelve satellites arranged in three circular orbital planes, with four satellites in each orbital plane, the satellites being evenly spaced at 90° intervals in each orbital plane at an altitude of 5600 nautical miles, each orbital plane being inclined at angle of 55° relative to the equatorial plane to insure that each station is within view of at least two of said satellites at all times at a viewing angle to the earth of not less than 10°.

32. The satellite-based cellular telecommunications system as set forth in claim 26, further including a gateway station in said predetermined region for establishing an RF communication link with a satellite.

33. The satellite-based cellular telecommunications system as set forth in claim 26, wherein each station is within view of at least one of said satellites at all times at a viewing angle of at least 10°.

* * * * *